US012605572B2

(12) United States Patent
Turiello

(10) Patent No.: US 12,605,572 B2
(45) Date of Patent: Apr. 21, 2026

(54) METHOD AND SYSTEM OF AUTOMATICALLY MODIFYING A RATE OF FILLING AN AIR BOTTLE WITH BREATHABLE AIR IN A FIREFIGHTER AIR REPLENISHMENT SYSTEM BASED ON FLOW RATE DETECTION THEREOF

(71) Applicant: RESCUE AIR SYSTEMS, INC., San Carlos, CA (US)

(72) Inventor: Anthony J. Turiello, Westlake, TX (US)

(73) Assignee: Rescue Air Systems, Inc., San Carlos, CA (US)

( * ) Notice: Subject to any disclaimer, the term of this patent is extended or adjusted under 35 U.S.C. 154(b) by 491 days.

(21) Appl. No.: 18/131,367

(22) Filed: Apr. 6, 2023

(65) Prior Publication Data
US 2024/0001165 A1 Jan. 4, 2024

Related U.S. Application Data

(60) Provisional application No. 63/356,996, filed on Jun. 29, 2022.

(51) Int. Cl.
*A62B 13/00* (2006.01)
*A62B 7/02* (2006.01)
(Continued)

(52) U.S. Cl.
CPC ................ *A62B 13/00* (2013.01); *A62B 7/02* (2013.01); *A62B 15/00* (2013.01); *F16L 3/26* (2013.01)

(58) Field of Classification Search
CPC ..... A62B 13/00; A62B 15/00; A62B 7/00–02; A62B 9/00; A62B 9/006; A62B 9/02;
(Continued)

(56) References Cited

U.S. PATENT DOCUMENTS 1,040,311 A 10/1912 Halloran
1,643,155 A 9/1927 Eisenschitz
(Continued)

FOREIGN PATENT DOCUMENTS

AR 070623 A1 4/2010
AU 2019101454 A4 1/2020
(Continued)

OTHER PUBLICATIONS

"Influence of Internal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.
(Continued)

*Primary Examiner* — Rachel T Sippel
(74) *Attorney, Agent, or Firm* — Foley & Lardner LLP

(57) ABSTRACT

Disclosed are methods and a safety system implemented within a structure of automatic modification of a rate of filling an air bottle with breathable air in the safety system. In accordance therewith, an air fill charge rate controller device is coupled to the breathable air from a source thereof in the safety system having a fixed piping system installed within the structure for supply of the breathable air across the safety system. A flow rate of the breathable air from the source thereof is detected through a flow sensor associated with the air fill charge rate controller device. In accordance with the detection of the flow rate, a control unit of the air fill charge rate controller device automatically modifies a fill rate at which the air bottle is to be filled with the breathable air.

20 Claims, 7 Drawing Sheets

(51) Int. Cl.
 *A62B 15/00* (2006.01)
 *F16L 3/26* (2006.01)
(58) Field of Classification Search
 CPC .......... A62B 9/04; B63C 11/18; B63C 11/22;
  B63C 2011/2272; A61M 2205/3396;
  A61M 2209/045; F17C 5/00–007; F17C
  5/06
 See application file for complete search history.

(56) References Cited

U.S. PATENT DOCUMENTS

| | | | |
|---|---|---|---|
| 2,341,113 A | 2/1944 | Nelson | |
| 3,429,186 A | 2/1969 | Price | |
| 3,477,688 A | 11/1969 | Cruse | |
| 3,625,065 A | 12/1971 | Thompson | |
| 3,925,763 A | 12/1975 | Wadhwani et al. | |
| 4,014,216 A | 3/1977 | Thornton | |
| 4,023,146 A | 5/1977 | Carroll | |
| 4,091,874 A | 5/1978 | Monma | |
| 4,134,457 A | 1/1979 | Raymond | |
| 4,165,738 A | 8/1979 | Dyer | |
| 4,336,590 A | 6/1982 | Jaco et al. | |
| 4,373,522 A | 2/1983 | Zien | |
| 4,375,637 A | 3/1983 | Desjardins | |
| 4,380,187 A | 4/1983 | Wicks | |
| 4,413,622 A | 11/1983 | Austin | |
| 4,467,796 A | 8/1984 | Beagley | |
| 4,570,719 A | 2/1986 | Wilk | |
| 4,856,565 A | 8/1989 | Schoeffl et al. | |
| 4,862,931 A | 9/1989 | Vella | |
| 4,905,684 A | 3/1990 | Heffer | |
| 5,095,899 A | 3/1992 | Green | |
| 5,163,422 A | 11/1992 | Burgess | |
| 5,396,885 A | 3/1995 | Nelson | |
| 5,497,855 A | 3/1996 | Moore | |
| 5,507,283 A | 4/1996 | Grivas | |
| 5,536,690 A | 7/1996 | Greer et al. | |
| 5,564,626 A | 10/1996 | Kettler et al. | |
| 5,570,685 A | 11/1996 | Turiello | |
| 5,619,333 A | 4/1997 | Staff et al. | |
| 5,707,005 A | 1/1998 | Kettler et al. | |
| 5,720,659 A | 2/1998 | Wicks | |
| 5,730,121 A | 3/1998 | Hawkins et al. | |
| 5,746,976 A | 5/1998 | Yamada et al. | |
| 5,800,260 A | 9/1998 | Kao | |
| 5,901,758 A * | 5/1999 | Hwang | F17C 5/06 |
| | | | 141/2 |
| 5,979,440 A | 11/1999 | Honkonen et al. | |
| 5,992,532 A | 11/1999 | Ramsey et al. | |
| 6,112,807 A | 9/2000 | Dage | |
| 6,310,552 B1 | 10/2001 | Stumberg et al. | |
| 6,357,532 B1 | 3/2002 | Laskaris et al. | |
| 6,369,716 B1 | 4/2002 | Abbas et al. | |
| 6,401,487 B1 | 6/2002 | Kotliar | |
| 6,418,752 B2 | 7/2002 | Kotliar | |
| 6,488,026 B2 | 12/2002 | Lauer | |
| 6,502,421 B2 | 1/2003 | Kotliar | |
| 6,543,444 B1 | 4/2003 | Lewis | |
| 6,585,583 B1 | 7/2003 | Chan | |
| 6,647,301 B1 | 11/2003 | Sederlund et al. | |
| 6,712,071 B1 | 3/2004 | Parker | |
| 6,810,910 B2 | 11/2004 | McHugh | |
| 6,832,952 B2 | 12/2004 | Faltesek et al. | |
| 6,866,102 B2 | 3/2005 | Boyce et al. | |
| 6,873,256 B2 | 3/2005 | Pedersen et al. | |
| 6,920,874 B1 | 7/2005 | Siegel | |
| 6,940,403 B2 | 9/2005 | Kail et al. | |
| 6,999,562 B2 | 2/2006 | Winick | |
| 7,091,852 B2 | 8/2006 | Mason et al. | |
| 7,100,689 B2 | 9/2006 | Williams et al. | |
| 7,124,833 B2 | 10/2006 | Sant'Angelo | |
| 7,161,481 B2 | 1/2007 | Turner | |
| 7,168,428 B1 | 1/2007 | Zoha | |
| 7,183,115 B1 | 2/2007 | Lauglin | |
| 7,186,084 B2 | 3/2007 | Bunker et al. | |
| 7,204,249 B1 | 4/2007 | Richey et al. | |
| 7,221,260 B2 | 5/2007 | Berezowski et al. | |
| 7,250,000 B2 | 7/2007 | Daniels | |
| 7,255,104 B2 | 8/2007 | Phillips | |
| 7,302,313 B2 | 11/2007 | Sharp et al. | |
| 7,347,204 B1 | 3/2008 | Lindsey et al. | |
| 7,377,835 B2 | 5/2008 | Parkulo et al. | |
| 7,395,704 B2 | 7/2008 | Difoggio | |
| 7,468,082 B2 | 12/2008 | Gordon | |
| 7,509,968 B2 | 3/2009 | Surawski | |
| 7,527,056 B2 | 5/2009 | Turiello | |
| 7,548,833 B2 | 6/2009 | Ahmed | |
| 7,568,375 B2 | 8/2009 | Sasaki et al. | |
| 7,598,856 B1 | 10/2009 | Nick et al. | |
| 7,621,269 B2 | 11/2009 | Turiello | |
| 7,654,279 B2 | 2/2010 | Horton et al. | |
| 7,658,190 B1 | 2/2010 | Phifer et al. | |
| 7,673,629 B2 | 3/2010 | Turiello | |
| 7,677,247 B2 | 3/2010 | Turiello | |
| 7,694,678 B2 | 4/2010 | Turiello | |
| 7,710,282 B1 | 5/2010 | Young | |
| 7,765,072 B2 | 7/2010 | Eller et al. | |
| 7,770,610 B2 | 8/2010 | Lisle | |
| 7,804,402 B2 | 9/2010 | Lang et al. | |
| 7,817,050 B2 | 10/2010 | Goodman et al. | |
| 7,823,609 B2 | 11/2010 | Wonders | |
| 7,857,068 B2 | 12/2010 | Wagner | |
| 7,868,752 B1 | 1/2011 | Herbold | |
| 7,880,807 B2 | 2/2011 | Olson et al. | |
| 7,921,869 B2 | 4/2011 | Surawski | |
| 7,934,411 B2 | 5/2011 | Koch | |
| 7,953,228 B2 | 5/2011 | Faltesek et al. | |
| 7,975,729 B2 | 7/2011 | Lisle | |
| 8,038,948 B1 | 10/2011 | Laughlin | |
| 8,074,278 B2 | 12/2011 | Law et al. | |
| 8,114,954 B2 | 2/2012 | DeBruin | |
| 8,116,913 B2 | 2/2012 | Mirpourian et al. | |
| 8,147,302 B2 | 4/2012 | Desrochers et al. | |
| 8,149,109 B2 | 4/2012 | Lontka | |
| 8,196,479 B2 | 6/2012 | Ludwick et al. | |
| 8,219,249 B2 | 7/2012 | Harrod et al. | |
| 8,291,941 B1 | 10/2012 | Berardi | |
| 8,371,295 B2 | 2/2013 | Turiello | |
| 8,375,876 B2 | 2/2013 | Van Tassel | |
| 8,375,948 B2 | 2/2013 | Turiello | |
| 8,381,726 B2 | 2/2013 | Turiello | |
| 8,413,653 B2 | 4/2013 | Turiello | |
| 8,443,800 B2 | 5/2013 | Turiello | |
| 8,517,696 B2 | 8/2013 | McLoughlin et al. | |
| 8,538,687 B2 | 9/2013 | Plocher et al. | |
| 8,573,317 B2 | 11/2013 | Krüger et al. | |
| 8,602,119 B2 | 12/2013 | Wagner | |
| 8,611,323 B2 | 12/2013 | Berger et al. | |
| 8,668,023 B2 | 3/2014 | Wilkins et al. | |
| 8,701,718 B1 | 4/2014 | Turiello | |
| 8,733,355 B2 | 5/2014 | Turiello | |
| 8,745,792 B2 | 6/2014 | McGlynn | |
| 8,755,839 B2 | 6/2014 | Parkulo et al. | |
| 8,770,190 B2 | 7/2014 | Doherty et al. | |
| 8,773,946 B2 | 7/2014 | Padmanabhan et al. | |
| 8,795,041 B2 | 8/2014 | Saito et al. | |
| 8,797,141 B2 | 8/2014 | Best et al. | |
| 8,797,210 B2 | 8/2014 | Derrick et al. | |
| 8,866,618 B2 | 10/2014 | Cotten et al. | |
| 8,995,946 B2 | 3/2015 | Miller | |
| 9,010,019 B2 | 4/2015 | Mittelmark | |
| 9,032,994 B2 | 5/2015 | McHugh et al. | |
| 9,033,061 B2 | 5/2015 | Chattaway et al. | |
| 9,105,171 B2 | 8/2015 | Flood et al. | |
| 9,109,981 B2 | 8/2015 | Sharp | |
| 9,134,284 B1 | 9/2015 | Laughlin | |
| 9,175,975 B2 | 11/2015 | Shtukater | |
| 9,220,937 B2 | 12/2015 | Wagner | |
| 9,234,661 B2 | 1/2016 | Young et al. | |
| 9,235,975 B2 | 1/2016 | Gettings et al. | |
| 9,242,126 B2 | 1/2016 | Turiello | |
| 9,243,753 B2 | 1/2016 | Wonders | |
| 9,328,936 B2 | 5/2016 | Meirav et al. | |
| 9,347,677 B2 | 5/2016 | Eberlein et al. | |

(56) References Cited

U.S. PATENT DOCUMENTS

| | | |
|---|---|---|
| 9,404,666 B2 | 8/2016 | Terison et al. |
| 9,466,199 B2 | 10/2016 | McNabb et al. |
| 9,468,157 B2 | 10/2016 | Hu |
| 9,564,028 B2 | 2/2017 | Cerrano |
| 9,566,608 B2 | 2/2017 | Tran |
| 9,670,670 B2 | 6/2017 | Teron |
| 9,671,794 B1 | 6/2017 | Lymberopoulos et al. |
| 9,682,257 B2 | 6/2017 | Zhao et al. |
| 9,702,802 B2 | 7/2017 | Ajay et al. |
| 9,724,484 B2 | 8/2017 | Robey |
| 9,733,149 B2 | 8/2017 | Eberlein |
| 9,829,895 B2 | 11/2017 | McLoughlin et al. |
| 9,852,604 B2 | 12/2017 | Poder |
| 9,875,631 B2 | 1/2018 | Mittleman et al. |
| 9,927,066 B1 | 3/2018 | Wonders |
| 9,933,115 B2 | 4/2018 | Rado et al. |
| 9,964,470 B2 | 5/2018 | Sharp |
| 10,042,164 B2 | 8/2018 | Kuutti et al. |
| 10,044,857 B2 | 8/2018 | Philbin |
| 10,052,509 B2 | 8/2018 | Wagner |
| 10,062,233 B1 | 8/2018 | Rogers et al. |
| 10,074,295 B2 | 9/2018 | Hyman |
| 10,078,865 B2 | 9/2018 | Joshi et al. |
| 10,121,361 B2 | 11/2018 | Deluliis et al. |
| 10,124,196 B2 | 11/2018 | Roberts |
| 10,139,282 B2 | 11/2018 | Chrostowski |
| 10,156,320 B2 | 12/2018 | Toelle |
| 10,161,923 B1 | 12/2018 | Laughlin |
| 10,192,411 B2 | 1/2019 | Wedig et al. |
| 10,311,444 B1 | 6/2019 | Conboy |
| 10,380,862 B1 | 8/2019 | Heidary |
| 10,380,863 B2 | 8/2019 | Wedig et al. |
| 10,400,442 B2 | 9/2019 | Power et al. |
| 10,417,451 B2 | 9/2019 | Park et al. |
| 10,426,064 B2 | 9/2019 | Slessman et al. |
| 10,490,055 B2 | 11/2019 | Myllymäki |
| 10,503,180 B2 | 12/2019 | Blackley |
| 10,529,215 B2 | 1/2020 | Brown |
| 10,563,886 B2 | 2/2020 | McCormick et al. |
| 10,632,331 B2 | 4/2020 | Mele |
| 10,639,508 B2 | 5/2020 | Müller et al. |
| 10,738,943 B2 | 8/2020 | Tilhof |
| 10,787,803 B2 | 9/2020 | Leahy |
| 10,789,665 B2 | 9/2020 | Comello |
| 10,808,396 B2 | 10/2020 | Zhang et al. |
| 10,834,482 B2 | 11/2020 | Speicher et al. |
| 10,890,294 B2 | 1/2021 | Santos et al. |
| 10,901,373 B2 | 1/2021 | Locke et al. |
| 10,969,131 B2 | 4/2021 | Sinha et al. |
| 11,009,186 B2 | 5/2021 | Sung |
| 11,027,236 B2 | 6/2021 | Maayan et al. |
| 11,045,800 B1 | 6/2021 | Kaplan et al. |
| 11,055,973 B2 | 7/2021 | Wedig et al. |
| 11,070,390 B2 | 7/2021 | Park et al. |
| 11,111,767 B2 | 9/2021 | Anders |
| 11,135,461 B2 | 10/2021 | Beechy et al. |
| 11,162,181 B2 | 11/2021 | Harano et al. |
| 11,181,875 B2 | 11/2021 | Kummer et al. |
| 11,185,650 B2 | 11/2021 | Almqvist |
| 11,187,223 B2 | 11/2021 | Ward et al. |
| 11,191,222 B2 | 12/2021 | Cho et al. |
| 11,226,604 B2 | 1/2022 | Goyal |
| 11,238,187 B2 | 2/2022 | Nikolayev et al. |
| 11,391,474 B2 | 7/2022 | Eplee |
| 11,410,539 B2 | 8/2022 | Kasiviswanathan |
| 11,426,553 B2 | 8/2022 | Dube et al. |
| 11,439,856 B2 | 9/2022 | Laskaris et al. |
| 11,514,764 B2 | 11/2022 | Correnti et al. |
| 11,536,476 B2 | 12/2022 | Nesier et al. |
| 11,719,625 B2 | 8/2023 | Carras et al. |
| 11,768,138 B2 | 9/2023 | Jamison et al. |
| 11,810,216 B1 | 11/2023 | Foiles et al. |
| 11,964,269 B2 | 4/2024 | Kaplan et al. |
| 12,339,267 B2 | 6/2025 | Lazea et al. |
| 12,345,433 B2 | 7/2025 | Pham et al. |

| | | | |
|---|---|---|---|
| 12,411,118 B2 | 9/2025 | McManus et al. | |
| 2001/0032892 A1 | 10/2001 | Brooks et al. | |
| 2002/0121381 A1 | 9/2002 | Reilly | |
| 2002/0185283 A1 | 12/2002 | Taylor | |
| 2003/0183300 A1 | 10/2003 | Siebert | |
| 2004/0045350 A1 | 3/2004 | Jones et al. | |
| 2005/0066711 A1 | 3/2005 | Discenzo | |
| 2006/0005880 A1 | 1/2006 | Baker et al. | |
| 2006/0173579 A1 | 8/2006 | Desrochers et al. | |
| 2006/0173580 A1 | 8/2006 | Desrochers et al. | |
| 2006/0196254 A1 | 9/2006 | Fjerdingstad et al. | |
| 2006/0213513 A1 | 9/2006 | Seong | |
| 2006/0234621 A1 | 10/2006 | Desrochers et al. | |
| 2007/0017520 A1* | 1/2007 | Gale | A61M 16/0858 |
| | | | 128/204.26 |
| 2007/0163578 A1 | 7/2007 | Lisle | |
| 2007/0175470 A1 | 8/2007 | Brookman et al. | |
| 2008/0041377 A1 | 2/2008 | Turiello | |
| 2008/0041378 A1 | 2/2008 | Turiello | |
| 2008/0041379 A1 | 2/2008 | Turiello | |
| 2008/0105443 A1 | 5/2008 | Molz et al. | |
| 2008/0236846 A1 | 10/2008 | Gamble et al. | |
| 2009/0159365 A1 | 6/2009 | O'Brien | |
| 2009/0178675 A1 | 7/2009 | Turiello | |
| 2009/0283151 A1 | 11/2009 | Turiello | |
| 2010/0031955 A1 | 2/2010 | Turiello | |
| 2010/0032040 A1 | 2/2010 | Turiello | |
| 2010/0081411 A1 | 4/2010 | Montenero | |
| 2010/0147297 A1 | 6/2010 | Brewer et al. | |
| 2010/0154922 A1 | 6/2010 | Turiello | |
| 2010/0201536 A1 | 8/2010 | Robertson et al. | |
| 2011/0187524 A1 | 8/2011 | Cochran, III | |
| 2011/0192479 A1 | 8/2011 | Yokota | |
| 2011/0259198 A1 | 10/2011 | Kim et al. | |
| 2011/0259580 A1 | 10/2011 | Head | |
| 2011/0277490 A1 | 11/2011 | Meirav | |
| 2012/0031525 A1 | 2/2012 | Wonders | |
| 2012/0266889 A1 | 10/2012 | Roberts | |
| 2013/0033377 A1 | 2/2013 | Hoseit | |
| 2013/0086933 A1 | 4/2013 | Holtkamp et al. | |
| 2013/0087153 A1 | 4/2013 | Jung | |
| 2013/0105010 A1 | 5/2013 | McLoughlin | |
| 2014/0077110 A1 | 3/2014 | Gamard et al. | |
| 2014/0188286 A1 | 7/2014 | Hunka | |
| 2014/0232876 A1 | 8/2014 | Dougherty | |
| 2014/0261406 A1 | 9/2014 | Fabian | |
| 2014/0338927 A1 | 11/2014 | Palle | |
| 2014/0349707 A1 | 11/2014 | Bang | |
| 2015/0033765 A1 | 2/2015 | Blalock | |
| 2015/0077737 A1 | 3/2015 | Belinsky et al. | |
| 2015/0096768 A1 | 4/2015 | DuBrucq et al. | |
| 2015/0130205 A1 | 5/2015 | Caskey | |
| 2015/0131262 A1 | 5/2015 | Mabry | |
| 2015/0170486 A1 | 6/2015 | Penland | |
| 2015/0204484 A1 | 7/2015 | Modirzareh et al. | |
| 2015/0217518 A1 | 8/2015 | Chun et al. | |
| 2015/0330873 A1 | 11/2015 | Atchison | |
| 2015/0369498 A1 | 12/2015 | Motornura et al. | |
| 2016/0003524 A1 | 1/2016 | Blalock | |
| 2016/0114196 A1 | 4/2016 | Tribble | |
| 2016/0116181 A1 | 4/2016 | Aultman et al. | |
| 2016/0133108 A1 | 5/2016 | Bucsa et al. | |
| 2016/0136017 A1 | 5/2016 | Caskey | |
| 2016/0138759 A1* | 5/2016 | Rado | F17C 5/06 |
| | | | 137/488 |
| 2016/0197772 A1 | 7/2016 | Britt et al. | |
| 2016/0334061 A1 | 11/2016 | Toelle | |
| 2016/0343187 A1 | 11/2016 | Trani | |
| 2017/0006107 A1 | 1/2017 | Dawes et al. | |
| 2017/0084156 A1 | 3/2017 | Myllymäki | |
| 2017/0122580 A1 | 5/2017 | Karamanos et al. | |
| 2017/0180829 A1 | 6/2017 | Schwarzkopf et al. | |
| 2017/0236397 A1 | 8/2017 | Myslenski et al. | |
| 2017/0303580 A1 | 10/2017 | Cameron et al. | |
| 2017/0310498 A1 | 10/2017 | Brandman et al. | |
| 2018/0181094 A1 | 6/2018 | Funk et al. | |
| 2018/0197393 A1 | 7/2018 | Gallo et al. | |
| 2018/0200552 A1 | 7/2018 | Wertsberger | |
| 2018/0243591 A1 | 8/2018 | DeWitt | |

(56)  References Cited

U.S. PATENT DOCUMENTS

| | | |
|---|---|---|
| 2018/0283614 A1 | 10/2018 | Gandolfo |
| 2018/0363939 A1 | 12/2018 | McCormick et al. |
| 2018/0375444 A1 | 12/2018 | Gamroth |
| 2019/0023529 A1 | 1/2019 | Lau |
| 2019/0103986 A1 | 4/2019 | Brandman et al. |
| 2019/0143161 A1 | 5/2019 | Burkhart et al. |
| 2019/0171780 A1 | 6/2019 | Santarone et al. |
| 2019/0174208 A1 | 6/2019 | Speicher et al. |
| 2019/0203885 A1 | 7/2019 | Sung |
| 2019/0277449 A1* | 9/2019 | Bourgeois ................. F17C 5/06 |
| 2019/0282839 A1 | 9/2019 | Wenzel et al. |
| 2020/0012307 A1 | 1/2020 | Scelzi |
| 2020/0054905 A1 | 2/2020 | Livchak et al. |
| 2020/0107475 A1 | 4/2020 | Keisling et al. |
| 2020/0143300 A1 | 5/2020 | Weldemariam et al. |
| 2020/0225313 A1 | 7/2020 | Coles |
| 2020/0232309 A1 | 7/2020 | Deutch et al. |
| 2020/0294372 A1 | 9/2020 | Rodriguez |
| 2020/0334778 A1 | 10/2020 | Lotter |
| 2020/0349661 A1 | 11/2020 | Dutta et al. |
| 2021/0023323 A1 | 1/2021 | Wilkinson et al. |
| 2021/0038926 A1 | 2/2021 | Reedy |
| 2021/0113864 A1 | 4/2021 | Nam |
| 2021/0183218 A1 | 6/2021 | Johnson et al. |
| 2021/0237309 A1 | 8/2021 | Tessien |
| 2021/0241595 A1 | 8/2021 | Young et al. |
| 2021/0268322 A1 | 9/2021 | Thomas et al. |
| 2021/0280034 A1 | 9/2021 | Wedig et al. |
| 2021/0297336 A1 | 9/2021 | Ramakrishnaiah et al. |
| 2021/0299495 A1 | 9/2021 | Feenstra et al. |
| 2021/0311008 A1 | 10/2021 | Hill |
| 2021/0358238 A1 | 11/2021 | Rogers et al. |
| 2021/0379429 A1 | 12/2021 | Darnell |
| 2022/0010996 A1 | 1/2022 | Carrieri |
| 2022/0019186 A1 | 1/2022 | De Andrade et al. |
| 2022/0099641 A1 | 3/2022 | Desrochers |
| 2022/0134147 A1 | 5/2022 | Webb et al. |
| 2022/0233900 A1 | 7/2022 | Williams |
| 2022/0260270 A1 | 8/2022 | Abate et al. |
| 2022/0297110 A1 | 9/2022 | Kaplan et al. |
| 2022/0404056 A1 | 12/2022 | Bloemer et al. |
| 2023/0034481 A1 | 2/2023 | Benton et al. |
| 2023/0070772 A1 | 3/2023 | Bingham et al. |
| 2023/0173128 A1 | 6/2023 | Slotkin et al. |
| 2023/0298346 A1 | 9/2023 | Alshammary |
| 2023/0319241 A1 | 10/2023 | Turiello et al. |
| 2024/0001178 A1 | 1/2024 | Turiello |
| 2024/0036537 A1 | 2/2024 | Gupta et al. |
| 2025/0216034 A1* | 7/2025 | Despres .................. F17C 11/00 |

FOREIGN PATENT DOCUMENTS

| | | |
|---|---|---|
| AU | 2021105506 A4 | 11/2021 |
| CA | 2760676 A1 | 11/2010 |
| CN | 101853549 A | 10/2010 |
| CN | 101968244 A | 2/2011 |
| CN | 201775882 U | 3/2011 |
| CN | 202052220 U | 11/2011 |
| CN | 202078672 U | 12/2011 |
| CN | 202615547 U | 12/2012 |
| CN | 102739786 B | 4/2013 |
| CN | 101298769 B1 | 8/2013 |
| CN | 203154649 U | 8/2013 |
| CN | 203160791 U | 8/2013 |
| CN | 203190560 U | 9/2013 |
| CN | 102364016 B | 2/2014 |
| CN | 102500021 B | 7/2014 |
| CN | 203799482 U | 8/2014 |
| CN | 102365458 B | 9/2014 |
| CN | 104056374 A | 9/2014 |
| CN | 104826248 A | 8/2015 |
| CN | 204534128 U | 8/2015 |
| CN | 104906717 A | 9/2015 |
| CN | 205031799 U | 2/2016 |
| CN | 104260763 8 | 8/2016 |
| CN | 105917208 A | 8/2016 |
| CN | 106310553 A | 1/2017 |
| CN | 106899665 A | 6/2017 |
| CN | 105143778 B | 8/2017 |
| CN | 105247269 A | 9/2017 |
| CN | 206808757 U | 12/2017 |
| CN | 107991999 A | 5/2018 |
| CN | 105892538 B | 8/2018 |
| CN | 207750720 U | 8/2018 |
| CN | 106546008 A | 9/2018 |
| CN | 105091097 B | 1/2019 |
| CN | 105547285 A | 1/2019 |
| CN | 208536257 U | 2/2019 |
| CN | 109859368 A | 6/2019 |
| CN | 109939387 A | 6/2019 |
| CN | 110469950 A | 11/2019 |
| CN | 110478804 A | 11/2019 |
| CN | 110494811 A | 11/2019 |
| CN | 110673739 A | 1/2020 |
| CN | 209926530 U | 1/2020 |
| CN | 210135667 U | 3/2020 |
| CN | 111210588 A | 5/2020 |
| CN | 210739978 U | 6/2020 |
| CN | 111544817 A | 8/2020 |
| CN | 110047240 B | 10/2020 |
| CN | 109404582 B | 11/2020 |
| CN | 112344484 A | 2/2021 |
| CN | 212491267 U | 2/2021 |
| CN | 112657081 A | 4/2021 |
| CN | 108295407 B | 5/2021 |
| CN | 111258251 A | 5/2021 |
| CN | 113365029 A | 9/2021 |
| CN | 110493568 B | 10/2021 |
| CN | 111243219 A | 11/2021 |
| CN | 214550694 U | 11/2021 |
| CN | 113769292 A | 12/2021 |
| CN | 113842716 A | 12/2021 |
| CN | 114146332 A | 3/2022 |
| CN | 114205385 A | 3/2022 |
| CN | 114235301 A | 3/2022 |
| CN | 106678991 8 | 5/2022 |
| CN | 114613092 A | 6/2022 |
| CN | 216855578 U | 7/2022 |
| CN | 217526213 U | 10/2022 |
| CN | 115645769 A | 1/2023 |
| EP | 2320397 B1 | 5/2012 |
| EP | 2 151 263 B1 | 3/2014 |
| EP | 2 982 416 A1 | 2/2016 |
| EP | 2373384 B1 | 10/2018 |
| GB | 2248884 A | 4/1992 |
| JP | H06-343709 A | 12/1994 |
| JP | H08-124064 A | 5/1996 |
| JP | 3397382 B2 | 4/2003 |
| JP | 2004-298554 A | 10/2004 |
| JP | 2005291634 A | 10/2005 |
| JP | 5117700 B2 | 1/2013 |
| JP | 5654124 B2 | 1/2015 |
| JP | 5719010 B2 | 5/2015 |
| JP | 6189404 B2 | 8/2017 |
| JP | 6321134 B2 | 5/2018 |
| JP | 2021186616 A | 12/2021 |
| JP | 7109988 B2 | 8/2022 |
| KR | 20050097400 A | 10/2005 |
| KR | 100880023 B1 | 2/2009 |
| KR | 10-2010-0012689 A | 2/2010 |
| KR | 100945260 B1 | 3/2010 |
| KR | 10-2010-0115024 A | 10/2010 |
| KR | 101024944 B1 | 3/2011 |
| KR | 20110078600 A | 7/2011 |
| KR | 20110002589 U | 11/2011 |
| KR | 101088547 B1 | 12/2011 |
| KR | 101089513 B1 | 12/2011 |
| KR | 101208662 B1 | 12/2012 |
| KR | 20130017610 A | 8/2013 |
| KR | 101722045 B1 | 3/2017 |
| KR | 101747360 B1 | 6/2017 |
| KR | 101762550 B1 | 7/2017 |
| KR | 101790694 B1 | 11/2017 |
| KR | 20170138810 A | 12/2017 |

(56)  References Cited

FOREIGN PATENT DOCUMENTS

| | | |
|---|---|---|
| KR | 101815533 81 | 1/2018 |
| KR | 101841954 B1 | 3/2018 |
| KR | 101845263 B1 | 4/2018 |
| KR | 101840682 B1 | 5/2018 |
| KR | 101845264 B1 | 5/2018 |
| KR | 101859878 B1 | 5/2018 |
| KR | 101859955 B1 | 5/2018 |
| KR | 101887164 B1 | 9/2018 |
| KR | 101902976 B1 | 10/2018 |
| KR | 10-2019-0043669 A | 4/2019 |
| KR | 20180001140 U | 6/2019 |
| KR | 101996949 B1 | 7/2019 |
| KR | 102008625 B1 | 8/2019 |
| KR | 101994222 B1 | 9/2019 |
| KR | 102035835 B1 | 10/2019 |
| KR | 10-2019-0131158 A | 11/2019 |
| KR | 102050539 B1 | 12/2019 |
| KR | 10-2020-0027390 A | 3/2020 |
| KR | 102169547 B1 | 10/2020 |
| KR | 102263178 B1 | 6/2021 |
| KR | 102277919 B1 | 7/2021 |
| KR | 102300167 B1 | 9/2021 |
| KR | 102355909 B1 | 2/2022 |
| KR | 20220056659 A | 5/2022 |
| NL | 2019479 B1 | 8/2018 |
| RU | 74076 U | 6/2008 |
| RU | 2465933 C2 | 11/2012 |
| RU | 2717525 C1 | 3/2020 |
| RU | 2724093 C1 | 6/2020 |
| TW | 201425832 A | 9/2015 |
| TW | M540352 U | 4/2017 |
| WO | 2003031892 A1 | 4/2003 |
| WO | 2006047246 A2 | 5/2006 |
| WO | 2008021538 A2 | 2/2008 |
| WO | 2010063266 A1 | 6/2010 |
| WO | 2011034334 A2 | 3/2011 |
| WO | 2014208865 A1 | 12/2014 |
| WO | 2016205053 A1 | 12/2016 |
| WO | 2018038434 A1 | 3/2018 |
| WO | 2018176196 A1 | 10/2018 |
| WO | 2018236571 A1 | 12/2018 |
| WO | WO-2021/250389 A1 | 12/2021 |
| WO | 2022066099 A1 | 3/2022 |
| WO | 2023000087 A1 | 1/2023 |

OTHER PUBLICATIONS

"Indoor air quality in green buildings: A case-study in a residential high-rise building in the northeastern United States". Published at Journal of Environmental Science and Health, Published on [Feb. 2015] http://surl.li/fdzxk.

"Indoor Air-Quality Data-Monitoring System: Long-Term Monitoring Benefits", Published at MDIP, Published on [Sep. 25, 2019] https://www.mdpi.com/1424-8220/19/19/4157.

"A review of air filtration technologies for sustainable and healthy building ventilation", Published at Sustainable Cities and Society, Published on [Jul. 2017] https://core.ac.uk/download/pdf/84587706.pdf.

"A novel constant-air-vol. range hood for high-rise residential buildings with 2 central shaft", Published at Energy and Buildings, Published on [May 2021] http://surl.li/feadf.

"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.

"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.

"Fire Safety", Published at Atomic Energy Regulatory Board India, Published on [May 2019] https://aerb.gov.in/images/PDF/fire.pdf.

"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.

"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.

"Review of research on air-conditioning systems and indoor air quality control for human health", Published at International Journal of Refrigeration, Published on [Jan. 2009] https://sci-hub.hkvisa.net/10.1016/j.ijrefrig.2008.05.004.

"A review of the performance of different ventilation and airflow distribution systems in buildings", Published at Building and Environment, Published on [Dec. 18, 2013] https://www.academia.edu/27228820/A_review_of_the_performance_of_different_ventilation_and_airflow_distribution_systems_in_buildings.

"Real-time sensors for indoor air monitoring and challenges ahead in deploying them to urban buildings", Published at Science of The Total Environment , Published on [Apr. 2016] https://eprints.ncl.ac.uk/file_store/production/223286/749E8E7D-D1EF-4056-BCDD-F48812167CB1.pdf.

"Indoor air quality and energy management through real-time sensing in commercial buildings ", Published at Energy and Buildings, Published on [Jan. 2016] https://eprints.qut.edu.au/220977/1/93777.pdf.

"Compressors and Compressed Air Systems", Published at Continuing Education and Development, Found on [Mar. 2023] https://www.cedengineering.com/userfiles/Compressors%20and%20Compressed%20Air%20Systems%20R1.pdf.

"HVAC System", Published at Energy Conservation Building Code (ECBC) Tip Sheet, Published on [ Jun. 2009] https://www.keralaenergy.gov.in/files/HVAC_System_Tip_Sheet.pdf.

"Air distribution of oxygen supply through guardrail slot diffusers in high-altitude hypoxic areas", Published at Building and Environment, Published on [Apr. 2020] https://rb.gy/9ktde6.

"Air Quality Control in Mine Refuge Chamber with Ventilation through Pressure Air Pipeline", Published at Process Safety and Environmental Protection, Published on [Dec. 2019] https://uhra.herts.ac.uk/bitstream/handle/2299/23249/Manuscript.pdf;jsessionid=6F0E7E29FB3FF03D59759181BA6A6161?sequence=1.

"Rescue Air for Firefighters", Published at Fire Engineering, Published on [Sep. 8, 2014] https://rescueair.com/wp-content/uploads/2020/03/rescue-air-for-firefighters.whitepaperpdf.render.pdf.

"The Case for Interior High-Rise Breathing Air Systems ", Published at Fire Engineering, Published on [Apr. 2012] https://rescueair.com/wp-content/uploads/2014/05/Rush-Article.pdf.

"RF Based Advance Smart Fire Safety System for Industries and Shopping Malls", Published at International Journal of Science and Research (IJSR), Published on [Dec. 2018] https://www.ijsr.net/archive/v7/12/ART20193898.pdf.

"Design and Implementation of Car Fire Detection and Automatic Car Door Opening Using IOT", Published at International Journal of Advances in Engineering and Management (IJAEM), Published on [ Jul. 7, 2022] https://ijaem.net/issue_dcp/Design%20and%20Implementation%20of%20Car%20Fire%20Detection%20and%20Automatic%20Car%20Door%20Opening%20Using%20Iot.pdf.

"Machine Vision Based Fire Detection Techniques: A Survey", Published al Springer Nature, Published on [Nov. 27, 2020] https://sci-hub.hkvisa.net/10.1007/s10694-020-01064-z.

"An Analysis of Firefighter Breathing Air Replenishment Systems", Published at Fire Protection Research Foundation , Published o[Apr. 2021] https://www.nfpa.org/-/media/Files/News-and-Research/Fire-statistics-and-reports/Emergency-responders/RFFAnalysisOfFFBARS.pdf.

"Fire Detection Systems in Wireless Sensor Networks", Published at World Conference on Technology, Innovation and Entrepreneurship, Published on [Jul. 3, 2015] https://www.sciencedirect.com/science/article/pii/S1877042815038872.

"Fire Safety System Building", Published at IOP Conference Series: Materials Science and Engineering, Published on[Nov. 2019] https://

(56) References Cited

OTHER PUBLICATIONS www.researchgate.net/publication/337402246_Fire_Safety_System_Building/fulltext/5dd573ae299bf11ec866bf2c/Fire-Safety-System-Building.pdf.

"SmartFire: Intelligent Platform for Monitoring Fire Extinguishers and Their Building Environment", Published at MDPI, Published on [May 25, 2019] https://www.mdpi.com/1424-8220/19/10/2390.

"A Smart Fire Detection System using IoT Technology With Automatic Water Sprinkler", Published at International Journal of Electrical and Computer Engineering (IJECE), Published on [Oct. 7, 2020] http://surl.li/esuhn.

"Situational Awareness for first responders:Evaluation of the BIMS field trial", Published at IEEE Xplore, Published on [Dec. 9, 2009] http://surl.li/esuid.

"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/links/5bb62f01299bf1049b6f57d7/Fire-Safety-in-Buildings.pdf.

"Ignis: Fire Detection and Mitigation System", Published at International Research Journal of Engineering and Technology (IRJET) , Published on [Jun. 6, 2021 ] https://www.irjet.net/archives/V8/i6/IRJET-V816493.pdf.

"An Intelligent Fire Detection and Mitigation System Safe from Fire (SFF)s", Published at International Journal of Computer Applications, Published on [Jan. 2016] https://www.ijcaonline.org/research/volume133/number6/mobin-2016-ijca-907858.pdf.

"Smart Fire Alert System Using IOT", Published at International Research Journal of Modernization in Engineering Technology and Science, Published on [Mar. 3, 2022 ] https://www.irjmets.com/uploadedfiles/paper/issue_3_march_2022/20213/final/fin_irjmets1648303966.pdf.

"Johnson Controls Acquires Rescue Air Systems To Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire-suppression-portfolio-co-5246-ga-co-1665048943-ga.1665049545.pdf.

"5.07 Air Replenishment Systems (2019)", Published at San Francisco Fire Department Bureau of Fire Prevention & Investigation, Found Online on [Feb. 8, 2014] https://sf-fire.org/media/1220/download?inline.

"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.

"Firefighter Air Replenishment Systems (FARS) Air Quality Fact Sheet ", Published at Firefighter Air Coalition, Publish Online on [Feb. 8, 2014] https://aircoalition.org/wp-content/uploads/2021/03/FAC-FARS-Air-Quality-White-Paper.pdf.

"Technical Brief on System Controls for Industrial Compressed Air Systems", Published at Compressed Air And Gas Institute, Found Online on [Feb. 15, 2022] https://www.cagi.org/assets/documents/pdfs/SystemControlsTechnicalBrief.pdf?updated=1657712699.

"Case Study—System Controls", Published at Compressed Air And Gas Institute, Found Online on [Feb. 15, 2022] https://www.cagi.org/assets/documents/pdfs/SystemControlsCaseStudy.pdf?updated=1657712699.

"Technical Brief—Heat Recovery from Industrial Compressed Air Systems", Published at Compressed Air And Gas Institute, Found Online on [Feb. 15, 2022] https://www.cagi.org/assets/documents/pdfs/HeatRecoveryTechnicalBrief.pdf?updated=1657712699.

"Technical Brief on Distribution Piping Network", Published at Compressed Air And Gas Institute, Found Online on [Feb. 15, 2022] https://www.cagi.org/assets/documents/pdfs/DistributionPipingNetworkTechnicalBrief.pdf?updated=1657712699.

"Technical Brief on Pressure Drop", Published at Compressed Air And Gas Institute, Found Online on [Feb. 15, 2022] https://www.cagi.org/assets/documents/pdfs/PressureDropTechnicalBrief.pdf?updated=1657712700.

"Technical Brief on Variable Speed Drive", Published at Compressed Air And Gas Institute, Found Online on [Feb. 15, 2022] https://www.cagi.org/assets/documents/pdfs/VariableSpeedDriveTechnicalBrief.pdf?updated=1657712699.

"Compressor Room Advantages with Oil-Free Centrifugal Air Compressors", Published at Compressed Air And Gas Institute, Found Online on [Feb. 15, 2022] https://www.cagi.org/pdf/downloads/compressor-room-advantages-with-oil-free-centrifugal-air-compressors.

"Preparing Reciprocating Air Compressors for Winter", Published at Compressed Air And Gas Institute, Found Online on [Feb. 15, 2022] https://www.cagi.org/pdf/downloads/preparing-reciprocating-air-compressors-for-winter.

"Nitrogen Characteristics and Benefits of On-Site Generation", Published at Compressed Air And Gas Institute, Found Online on [Feb. 15, 2022] https://www.cagi.org/pdf/downloads/19-nitrogen-characteristics-and-benefits-of-on-site-generation.

"Key Considerations for Installing Centrifugal Air Compressors", Published at Compressed Air And Gas Institute, Found Online on [Feb. 15, 2022] https://www.cagi.org/pdf/downloads/20-key-considerations-for-installing-centrifugal-air-compressors.

"Compressed Air & Gas Handbook", Published at Compressed Air And Gas Institute, Found Online on [Feb. 15, 2022] https://www.cagi.org/handbook-pdfs/handbook-chapter-1.

"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.

"Fire Hazard in Buildings: Review,Assessment and Strategies For Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review-assessment-and-strategies-for-improving-fire-safety.

"Environmental Study Of Firefighters", Published at University of California, Publish on [Sep. 8, 2015] https://sci-hub.hkvisa.net/10.1093/annhyg/35.6.581.

"Summary of human responses to ventilation", Published at California Digital Library University of Clifiornia, Publish on [Jun. 1, 2004] https://escholarship.org/content/qt64k2p4dc/qt64k2p4dc.pdf.

"Fixed Fire Protection Systems in Tunnels:Issues and Directions", Published at Fire Technology, Publish on [Sep. 30, 2010] https://sci-hub.hkvisa.net/10.1007/s10694-011-0220-2.

"Comparison of Underfloor Vs. Overhead Air Distribution Systems in an Office Building", Published at Department of Architecture, Waseda University, Found Online on [Feb. 15, 2022]. https://www.airfixture.com/wp-content/uploads/2016/07/ASHRAE-Underfloor-vs-Overhead-Study.pdf.

"General Requirements in piping Design", Published at RMIT University in partnership with Informit Open, Publish on [Jul. 2021] https://search.informit.org/doi/epdf/10.3316/informit.947188479100130.

"Optimal operation of heat supply systems with piping network", Published at Department of Mechanical Engineering, Osaka Prefecture University, Publish on [ Oct. 14, 2016] https://sci-hub.hkvisa.net/10.1016/j.energy.2017.03.146.

"Compressed Air Piping Network Inspection And Documentation For PAROC", Published at Turku University of Applied Sciences, Found Online on [Feb. 15, 2022] https://www.theseus.fi/bitstream/handle/10024/122415/Myllyniemi_Jani.pdf?sequence=1.

"Natural Gas Pipeline Technology Overview", Publish at Argonne National Laboratory, Publish on [ Nov. 2007] https://publications.anl.gov/anlpubs/2008/02/61034.pdf.

"Improving the indoor air quality using the individual air supply system", Publish at Int. J. Environ. Sci. Technol., Publish on [ Jul. 24, 2017] https://link.springer.com/content/pdf/10.1007/s13762-017-1432-x.pdf?pdf=button.

"Analytical Modeling of Fire Smoke Spread in High-rise Buildings",Canada Publish on [ Sep. 2016]. https://core.ac.uk/download/pdf/211519293.pdf.

"Research and Perspectives on Fire-Fighting Systems in Tunnels under Strong Piston Wind Action", By Xiaoyi Zhao et al., Published

(56) References Cited

OTHER PUBLICATIONS at Construction Management, and Computers & Digitization, Published on [Jan. 31, 2023] https://www.mdpi.com/2075-5309/13/2/435.

"Wireless sensor network applications in monitoring and control of gas networks", By Sajad Balall Dehkordi et al., Published at Majlesi Journal of Telecommunication Devices , Published on [Jun. 23, 2012] https://mjtd.isfahan.iau.ir/article_695667_a4c0e30293098b0ac5497f27c4315bb9.pdf.

"Sustainability of Air Supply in Areas Immediately Dangerous to Life and Health", By Christopher W. Norris, Published at Northampton Fire Department,MA , Published in [Feb. 2008] https://apps.usfa.fema.gov/pdf/efop/efo41710.pdf.

"Sensor-based safety management", By Amin Asadzadeh et al., Published at Automation in Construction , Published on [Feb. 7, 2020] https://sci-hub.hkvisa.net/10.1016/j.autcon.2020.103128.

"Remote Monitoring and Control Using Mobile Phones", By Dr. Mikael Sjodin, Published at Newline Information , Published in [Nov. 2001] http://www.es.mdh.se/pdf_publications/413.pdf.

"Monitored Performance of an Office Buildingwith an Under-Floor Air Distribution System", By Christine E. Walker et al., Published at Fifth International Conference for Enhanced Building Operations, Pittsburgh, Pennsylvania , Published on [Oct. 13, 2005] https://oaktrust.library.tamu.edu/bitstream/handle/1969.1/5105/ESL-IC-05-10-13.pdf?sequence=4.

"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.

"Firefighter Fatalities in the US in 2021", By Richard Campbell et al., Published at National Fire Protection Association (NFPA), Published in [Jun. 2023] https://www.nfpa.org/-/media/Files/News-and-Research/Fire-statistics-and-reports/Emergency-responders/osFFF.pdf.

"Reversible Longitudinal Smoke Extraction System in Enclosed Underground Parking Structure", By KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.

"Mapping Fire and Firefighter Visibility for Improving Situational Awareness", By Katherine Ann Mistick, Published at The University of Utah ProQuest Dissertations , Published in [May 2022] https://www.proquest.com/openview/089c0ac0998979da3b550b77ddee2bf1/17pq-origsite=gscholar&cbl=18750&diss=y.

"An ultra-wide band indoor personnel tracking system for emergency situations (Europcom)", By Anthony Putorti Jr. et al., Published at Radar Conference, 2008. EuRAD 2008. European, Published in [Dec. 2008] http://surl.li/hqxep.

"Threat modeling in smart firefighting systems: Aligning MITRE ATT&CK matrix and NIST security controls", Shahzaib Zahid et al., Published at Internet of Things, Published on [Mar. 21, 2023] https://tinyurl.com/msjusd3y.

"Autonomous Fire Suppression Systemfor Use in High and Low VisibilityEnvironments by Visual Servoing", By Joshua G. McNeil et al., Published at Fire Technology 2016, Published on [ Jan. 7, 2016] https://sci-hub.hkvisa.net/10.1007/s10694-016-0564-8.

"Breathing Limited Air Situational Training Masks (BlastMask) Versus SelfContained Breathing Apparatus (SCBA) for Firefighters: A Pilot Study", By Thomas L. Andre et al., Published at International journal of exercise science, Published in [2019] https://digitalcommons.wku.edu/cgi/viewcontent.cgi?article=2498&context=ijes.

"Internet of Things technology for fire monitoring system", By S.R.Vijayalakshmi et al., Published at International Research Journal of Engineering and Technology (IRJET), Published on [Jun. 6, 2017] https://www.irjet.net/archives/V4/16/IRJET-V416418.pdf.

"Firefighter Safety Using IoT", By Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.

"A smart fire detection system using IoT technology with automatic water sprinkler", By Hamood Alqourabah et al.. Published at International Journal of Electrical and Computer Engineering (IJECE), Published on [ Mar. 5, 2021] https://pdfs.semanticscholar.org/f3e7/a7c0cf2d448be592421045033506e845e6c2.pdf.

"Route Planning for Fire Rescue Operations in Long-Term Care Facilities Using Ontology and Building Information Models", By Ru-Guan Wang et al., Published at Building Information Modelling, Semantic Web and Internet-of-Things for Smart Cities, Published on [Jul. 21, 2022] https://www.mdpi.com/2075-5309/12/7/1060?type=check_update&version=2.

International Search Report and Written Opinion for Appl. Ser. No. PCT/IB2024/050603 dated Apr. 24, 2024 (10 pages).

International Search Report and Written Opinion issued in connection with PCT/US2023/014763 dated Jun. 21, 2023 (8 pages).

International Search Report and Written Opinion issued in connection with PCT/US2023/014764 dated Jun. 23, 2023 (9 pages).

International Search Report and Written Opinion issued in connection with PCT/US2023/014765 dated Jun. 27, 2023 (10 pages).

International Search Report and Written Opinion issued in connection with PCT/US2023/017653 dated Jul. 24, 2023 (9 pages).

International Search Report and Written Opinion issued in connection with PCT/US2023/017656 dated Jul. 19, 2023 (10 pages).

International Search Report and Written Opinion issued in connection with PCT/US2023/017803 dated Jul. 24, 2023 (8 pages).

International Search Report and Written Opinion issued in connection with PCT/US2023/018401 dated Jul. 27, 2023 (10 pages).

International Search Report and Written Opinion issued in connection with PCT/US2023/019880 dated Aug. 2, 2023 (8 pages).

International Search Report and Written Opinion issued in connection with PCT/US2023/022222 dated Aug. 24, 2023 (11 pages).

International Search Report and Written Opinion issued in connection with PCT/US2023/022223 dated Sep. 4, 2023 (7 pages).

International Search Report and Written Opinion issued in connection with PCT/US2023/024766 dated Oct. 4, 2023 (7 pages).

International Search Report and Written Opinion issued in connection with PCT/US2023/025646 dated Oct. 11, 2023 (10 pages).

International Search Report and Written Opinion issued in connection with PCT/US2023/025647 dated Oct. 4, 2023 (10 pages).

International Search Report and Written Opinion issued in connection with PCT/US2023/026172 dated Oct. 31, 2023 (9 pages).

International Search Report and Written Opinion issued in connection with PCT/US2023/026174 dated Oct. 20, 2023 (7 pages).

International Search Report and Written Opinion issued in connection with PCT/US2023/026176 dated Oct. 17, 2023 (7 pages).

International Search Report and Written Opinion issued in connection with PCT/US2023/026425 dated Oct. 17, 2023 (12 pages).

International Search Report and Written Opinion issued in connection with PCT/US2023/026428 dated Oct. 17, 2023 (8 pages).

International Search Report and Written Opinion issued in connection with PCT/US2023/026466 dated Nov. 1, 2023 (8 pages).

ENMET—Product Information, "Compressed Airline Monitors & Respiratory Air Monitors & Portable Breathing Air Systems," 2025 (2 pages).

Kinaeva et al., "Machine Learning Algorithms for Regression Analysis and Predictions of Numerical Data," 2021 3rd International Congress on Human-Computer Interaction, Optimization and Robotic Applications, 2021 (pp. 1-6).

Rush III, J.D., "Monitor Your Air Supply" Fire Engineering, 2014 (2 pages).

Trevino, "What Every Firefighter Needs to Know About FARS," Fire Apparatus & Emergency Equipment, 2016 (pp. 1-8).

US Navy—"Chapter 6 Fire-Fighting Systems" https://www.globalsecurity.org/rnilitary/libraiy/policy/navy/nrtc/14057_pprch6.pdf—U.S. Navy training manual NAVEDTRA 14057, Damage Controlman course; published in 1998 (20 pages).

* cited by examiner

EMERGENCY EVENT 170 : LEAKAGE OF BREATHABLE AIR 103

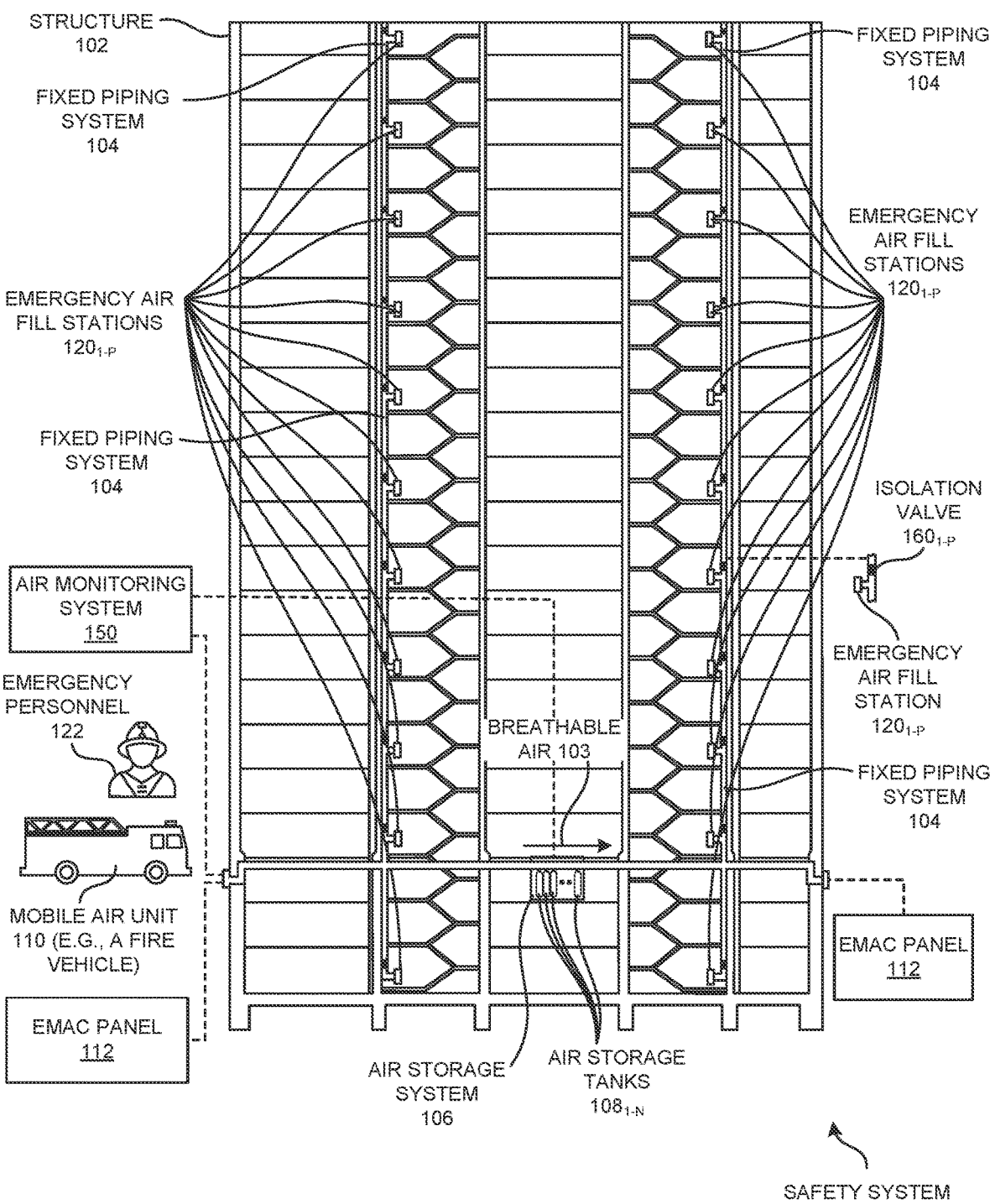

STRUCTURE 102

FIXED PIPING SYSTEM 104

FIXED PIPING SYSTEM 104

EMERGENCY AIR FILL STATIONS $120_{1-P}$

FIXED PIPING SYSTEM 104

AIR MONITORING SYSTEM 150

EMERGENCY PERSONNEL 122

MOBILE AIR UNIT 110 (E.G., A FIRE VEHICLE)

EMAC PANEL 112

FIXED PIPING SYSTEM 104

EMERGENCY AIR FILL STATIONS $120_{1-P}$

ISOLATION VALVE $160_{1-P}$

EMERGENCY AIR FILL STATION $120_{1-P}$

FIXED PIPING SYSTEM 104

BREATHABLE AIR 103

EMAC PANEL 112

AIR STORAGE SYSTEM 106

AIR STORAGE TANKS $108_{1-N}$

SAFETY SYSTEM 100

FIG. 1

AIR STORAGE SYSTEM 106

AIR FILL CHARGE RATE CONTROLLER DEVICE 250

FIXED PIPING SYSTEM 104

FRONT PANEL 304

EMERGENCY AIR FILL PANEL 300 (EXAMPLE EMERGENCY AIR FILL STATION 120₁₋P)

FILL RATE 290

FILL HOSES 302₁₋L

CONNECTORS 306₁₋L

AIR BOTTLE 270

METHOD AND SYSTEM OF AUTOMATICALLY MODIFYING A RATE OF FILLING AN AIR BOTTLE WITH BREATHABLE AIR IN A FIREFIGHTER AIR REPLENISHMENT SYSTEM BASED ON FLOW RATE DETECTION THEREOF

CLAIM OF PRIORITY

This Application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022. The contents of the aforementioned application are incorporated herein by reference in entirety thereof.

FIELD OF TECHNOLOGY

This disclosure relates generally to emergency systems and, more particularly, to methods and/or a system of automatically modifying a rate of filling an air bottle with breathable air in a safety system implemented within a structure based on flow rate detection thereof.

BACKGROUND

A structure (e.g., a vertical building, a horizontal building, a tunnel, marine craft, a mine) may have a Firefighter Air Replenishment System (FARS) implemented therein. The FARS may be employed to provide pure and safe breathable air to emergency personnel and/or maintenance personnel associated therewith. For the aforementioned purpose and especially during emergencies, the FARS may enable breathable air to be filled into air bottles/cylinders through components thereof. The air bottles/cylinders may be filled at a rate high enough for the breathable air therewithin to heat up. This may provide for safety concerns with regard to the emergency and/or the maintenance personnel. Further, the breathable air within the air bottles/cylinders may after some time (e.g., 1 hour later, 2 hours later) be at a pressure that is less than what is desirable or prescribed by regulatory authorities/safety standards.

SUMMARY

Disclosed are methods and/or a system of automatically modifying a rate of filling an air bottle with breathable air in a safety system implemented within a structure based on flow rate detection thereof.

In one aspect, a method of a safety system of a structure having a fixed piping system implemented therein to supply breathable air from a source at a fill rate at which an air bottle is fillable with the breathable air is disclosed. The method includes detecting a flow rate of the breathable air from the source, and, in accordance with the detection of the flow rate, automatically modifying the fill rate.

In another aspect, a method of a safety system of a structure having a fixed piping system implemented therein to supply breathable air from a source at a fill rate at which an air bottle is fillable with the breathable air is disclosed. The method includes detecting a flow rate of the breathable air from the source, and, in accordance with the detection of the flow rate, automatically modifying the fill rate. The method also includes filling the air bottle through the safety system with the breathable air at the automatically modified fill rate of the breathable air.

In yet another aspect, a safety system of a structure includes a source of breathable air, and a fixed piping system installed within the structure for supply of the breathable air across the safety system. The safety system also includes an air fill charge rate controller device coupled to the breathable air from the source thereof in the safety system, and a flow sensor associated with the air fill charge rate controller device to detect a flow rate of the breathable air from the source of the breathable air. The air fill charge rate controller device includes a control unit to, in accordance with the detection of the flow rate, automatically modify a fill rate at which an air bottle is to be filled with the breathable air.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 1 is a schematic and an illustrative view of a safety system associated with a structure, according to one or more embodiments.

Figure 2:
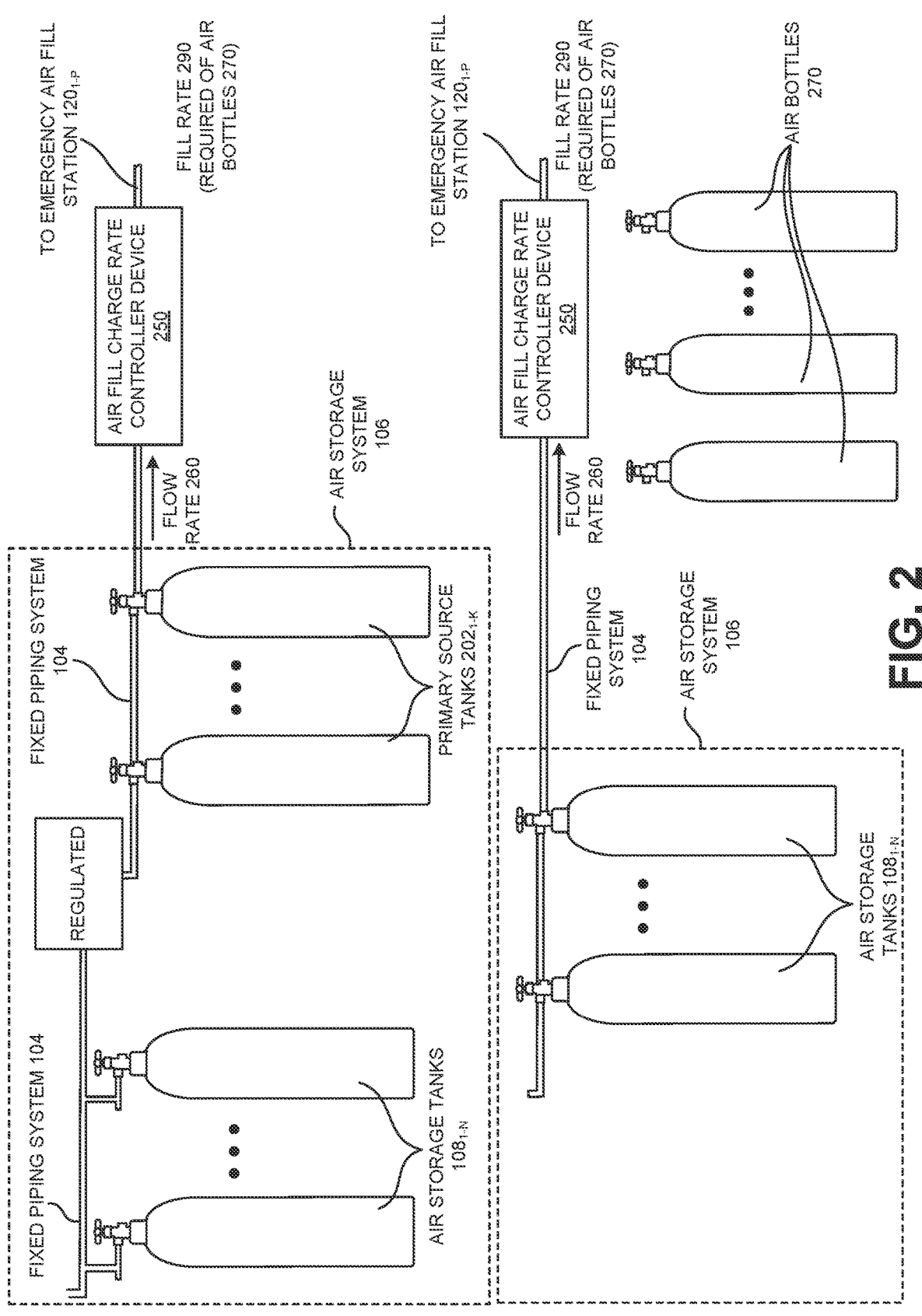
FIG. 2 is a schematic view of the air storage system of the safety system of FIG. 1 with an air fill charge rate controller device, according to one or more embodiments.

Other features of the present embodiments will be apparent from the accompanying drawings and from the detailed description that follows.

DETAILED DESCRIPTION

Example embodiments, as described below, may be used to provide methods and/or a system of automatically modifying a rate of filling an air bottle with breathable air in a safety system implemented within a structure based on flow rate detection thereof. Although the present embodiments have been described with reference to specific example embodiments, it will be evident that various modifications and changes may be made to these embodiments without departing from the broader spirit and scope of the various embodiments.

FIG. 1 shows a safety system 100 associated with a structure 102, according to one or more embodiments. In one or more embodiments, safety system 100 may be a Firefighter Air Replenishment System (FARS) to enable firefighters entering structure 102 in times of fire-related emergencies to gain access to breathable (e.g., human breathable) air (e.g., breathable air 103) in-house without the need of bringing in air bottles/cylinders to be transported up several flights of stairs of structure 102 or deep thereinto, or to refill depleted air bottles/cylinders that are brought into structure 102. In one or more embodiments, safety system 100 may supply breathable air provided from a supply of air tanks (to be discussed) stored in structure 102. When a fire department vehicle arrives at structure 102 during an emergency, breathable air supply typically may be provided through a source of air connected to said vehicle. In one or more embodiments, safety system 100 may enable firefighters to refill air bottles/cylinders thereof at emergency air fill stations (to be discussed) located throughout structure 102. Specifically, in some embodiments, firefighters may be able to fill air bottles/cylinders thereof at emergency air fill stations within structure 102 under full respiration in less than one to two minutes.

In one or more embodiments, structure 102 may encompass vertical building structures, horizontal building structures (e.g., shopping malls, hypermarts, extended shopping, storage and/or warehousing related structures), tunnels, marine craft (e.g., large marine vessels such as cruise ships, cargo ships, submarines and large naval craft, which may be "floating" versions of buildings and horizontal structures) and mines. Other structures are within the scope of the exemplary embodiments discussed herein. In one or more embodiments, safety system 100 may include a fixed piping system 104 permanently installed within structure 102 serving as a constant source of replenishment of breathable air 103. Fixed piping system 104 may be regarded as being analogous to a water piping system within structure 102 or another structure analogous thereto for the sake of imaginative convenience.

As shown in FIG. 1, fixed piping system 104 may distribute breathable air 103 across floors/levels of structure 102. For the aforementioned purpose, fixed piping system 104 may distribute breathable air 103 from an air storage system 106 (e.g., within structure 102) including a number of air storage tanks $108_{1-N}$ that serve as sources of pressurized/compressed air (e.g., breathable air 103). Additionally, in one or more embodiments, fixed piping system 104 may interconnect with a mobile air unit 110 (e.g., a fire vehicle) through an External Mobile Air Connection (EMAC) panel 112.

In one or more embodiments, EMAC panel 112 may be a boxed structure (e.g., exterior to structure 102) to enable the interconnection between mobile air unit 110 and safety system 100. For example, mobile air unit 110 may include an on-board air compressor to store and replenish pressurized/compressed air (e.g., breathable air analogous to breathable air 103) in air bottles/cylinders (e.g., utilizable with Self-Contained Breathing Apparatuses (SCBAs) carried by firefighters). Mobile air unit 110 may also include other pieces of air supply/distribution equipment (e.g., piping and/or air cylinders/bottles) that may be able to leverage the sources of breathable air 103 within safety system 100 through EMAC panel 112. Firefighters, for example, may be able to fill breathable air (e.g., breathable air 103, breathable air analogous to breathable air 103) into air bottles/cylinders (e.g., spare bottles, bottles requiring replenishment of breathable air) carried on mobile air unit 110 through safety system 100.

In FIG. 1, EMAC panel 112 is shown at two locations merely for the sake of illustrative convenience. In one or more embodiments, an air monitoring system 150 may be installed as part of safety system 100 to automatically track and monitor a parameter (e.g., pressure) and/or a quality (e.g., indicated by moisture levels, carbon monoxide levels) of breathable air 103 within safety system 100. FIG. 1 shows air monitoring system 150 as communicatively coupled to air storage system 106 and EMAC panel 112 merely for the sake of example. It should be noted that EMAC panel 112 may be at a remote location associated with (e.g., internal to, external to) structure 102. In one or more embodiments, for monitoring the parameters and/or the quality of breathable air within safety system 100, air monitoring system 150 include appropriate sensors and circuitries therein. For example, a pressure sensor (to be discussed) within air monitoring system 150 may automatically sense and record a pressure of breathable air 103 of safety system 100. Said pressure sensor may communicate with an alarm system that is triggered when the sensed pressure is outside a safety range. Also, in one or more embodiments, air monitoring system 150 may automatically trigger a shutdown of breathable air distribution through safety system 100 in case of impurity/contaminant (e.g., carbon monoxide) detection therethrough yielding levels above a safety/predetermined threshold.

In one or more embodiments, fixed piping system 104 may include pipes (e.g., constituted out of stainless steel tubing) that distribute breathable air 103 to a number of emergency air fill stations $120_{1-P}$ within structure 102. In one example implementation, each emergency air fill station $120_{1-P}$ may be located at a specific level of structure 102. If structure 102 is regarded as a vertical building structure, an emergency air fill station $120_{1-P}$ may be located at each of a basement level, a first floor level, a second floor level and so on. For example, emergency air fill station $120_{1-P}$ may be located at the end of the flight of stairs that emergency fighting personnel (e.g., firefighting personnel) need to climb to reach a specific floor level within the vertical building structure.

In one or more embodiments, an emergency air fill station $120_{1-P}$ may be a static location within a level of structure 102 that provides emergency personnel 122 (e.g., firefighters, emergency responders) with the ability to rapidly fill air bottles/cylinders (e.g., SCBA cylinders). In one or more embodiments, emergency air fill station $120_{1-P}$ may be an emergency air fill panel or a rupture containment air fill station. In one or more embodiments, proximate each emergency air fill station $120_{1-P}$, safety system 100 may include an isolation valve $160_{1-P}$ to isolate a corresponding emergency air fill station $120_{1-P}$ from a rest of safety system 100. For example, said isolation may be achieved through the manual turning of isolation valve $160_{1-P}$ proximate the corresponding emergency air fill station $120_{1-P}$ or remotely (e.g., based on automatic turning) from air monitoring system 150. In one example implementation, air monitoring system 150 may maintain breathable air supply to a subset of emergency air fill stations $120_{1-P}$ through control of a corresponding subset of isolation valves $160_{1-P}$ and may isolate the other emergency air fill stations $120_{1-P}$ from the breathable air supply. It should be noted that configurations and components of safety system 100 may vary from the example safety system 100 of FIG. 1.

FIG. 2 shows air storage system 106, according to one or more embodiments. In one or more embodiments, as discussed above, air storage system 106 may include a number of air storage tanks $108_{1-N}$ serving as sources of breathable air. However, in one or more embodiments, direct utilization of air storage tanks $108_{1-N}$ to fill air bottles during an emergency at structure 102 may deplete breathable air 103 in air storage tanks $108_{1-N}$. In order for breathable air 103 at the appropriate pressure (e.g., based on a standard; 5500 Pounds per Square Inch (PSI), 4500 PSI) to fill one or more air bottles at a fill rate dictated by a regulatory requirement (e.g., a fire department requirement; an example regulatory requirement may be to fill two air bottles within two minutes or less), air storage system 106 may include one or more primary source tanks $202_{1-K}$ in which breathable air 103 is maintained at the appropriate pressure discussed above. In one or more embodiments, these primary source tanks $202_{1-K}$ may be coupled to air storage tanks $108_{1-N}$ and may be utilized to fill air bottles (e.g., air bottles 270) via emergency air fill stations $120_{1-P}$.

In one or more embodiments, breathable air 103 from air storage tanks $108_{1-N}$ may flow to primary source tanks $202_{1-K}$ in a regulated manner such that a pressure of breathable air 103 within primary source tanks $202_{1-K}$ may be at an optimum level required to fill air bottles 270. In one or more embodiments, breathable air 103 from primary source tanks $202_{1-K}$ may be distributed via fixed piping system 104 to emergency air fill stations $120_{1-P}$ (e.g., emergency air fill panels, rupture containment air fill stations) that may serve as static locations at which air bottles 270 are filled. It is also possible to envision air storage system 106 without primary source tanks $202_{1-K}$ as also seen in FIG. 2, where breathable air 103 from air storage tanks $108_{1-N}$ may be distributed via fixed piping system 104 to emergency air fill stations $120_{1-P}$, according to one or more embodiments.

FIG. 2 also includes an air fill charge rate controller device 250 coupled to an output of air storage system 106, according to one or more embodiments. In one or more embodiments, air fill charge rate controller device 250 may be an electromechanical device to detect a flow rate 260 of breathable air 103 out of air storage system 106 and regulate said flow rate 260 in accordance with a specific fill rate 290 required of air bottles (e.g., air bottles 270) with respect to filling/replenishment thereof. Without air fill charge rate controller device 250, breathable air 103 may be filled into air bottles 270 at a fill rate high enough for breathable air 103 within air bottles 270 to heat up, which may provide for safety concerns. Further, breathable air 103 within air bottles 270 may after some time (e.g., 1 hour later, 2 hours later) be at a pressure that is less than what is desirable or prescribed by regulatory authorities/safety standards.

It is possible to envision air bottles 270 being filled directly at an output of air fill charge rate controller device 250 in absolute emergencies. For the aforementioned purpose, in some embodiments, air fill charge rate controller device 250 may include one or more interfaces (not shown) therefor.

Figure 3:
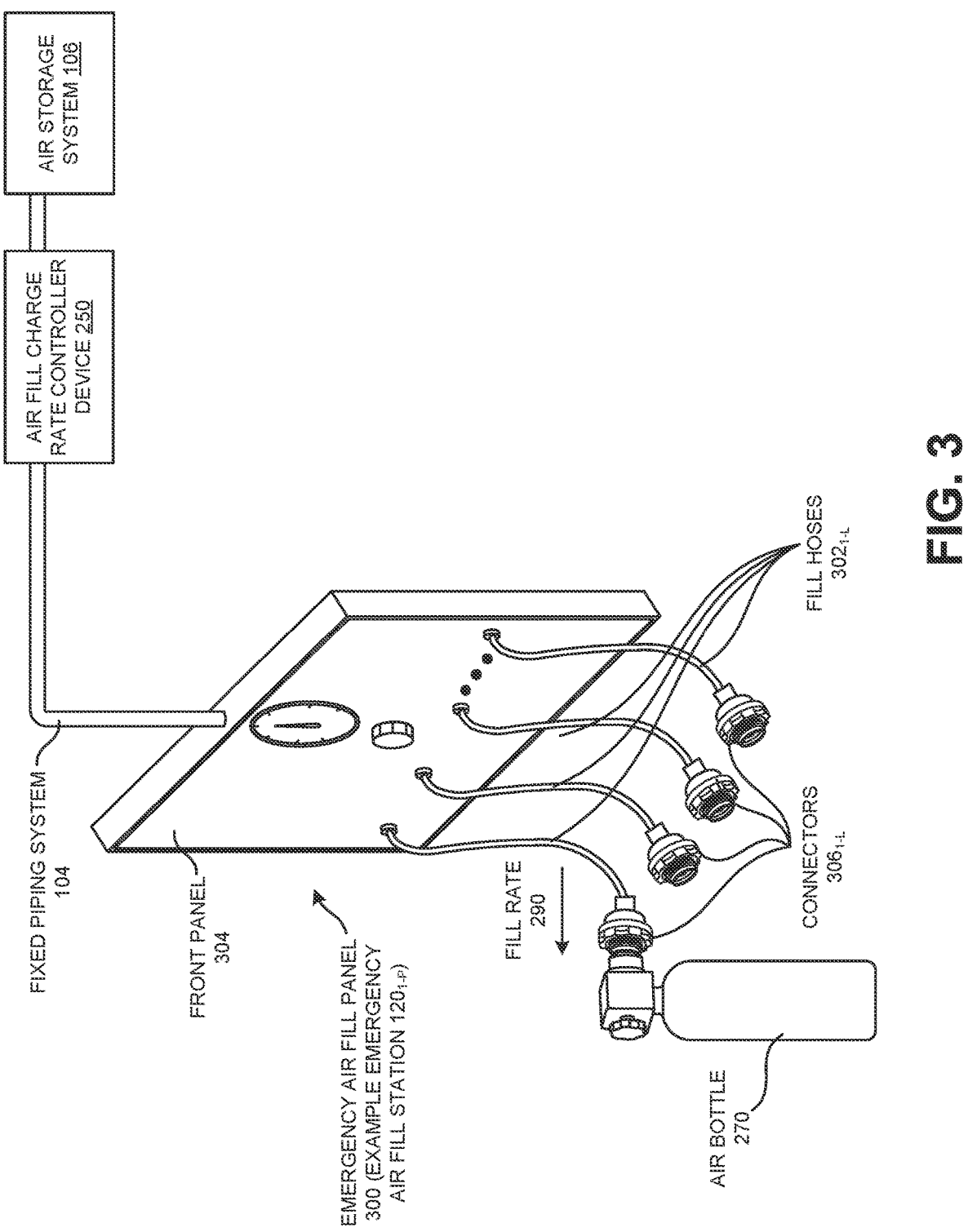
FIG. 3 is a schematic and an illustrative view of an emergency air fill panel as an example emergency air fill station of the safety system of FIG. 1 with the air fill charge rate controller device of FIG. 2, in which an air bottle is coupled to the emergency air fill panel.

FIG. 3 shows an emergency air fill panel 300 as an example emergency air fill station $120_{1-P}$, according to one or more embodiments. In one or more embodiments, emergency air fill panel 300 may enable firefighters/emergency personnel to rapidly fill air bottles 270 thereof through the use of connectors (to be discussed). In one or more embodiments, a number of fill hoses $302_{1-L}$ may protrude from a front panel 304 of emergency air fill panel 300; each of said fill hoses $302_{1-L}$ may have a connector $306_{1-L}$ (e.g., a Rapid Intervention Crew Universal Air Coupling (RIC/UAC) connector) at an end (e.g., free end) thereof not attached to front panel 304. Typically, in one or more embodiments, emergency air fill panel 300 may be directly coupled (e.g., connected) to air bottles 270 by way of connector $306_{1-L}$, as shown in FIG. 3. This is especially the case in the embodiments relevant to FIGS. 2-3. In one or more embodiments, emergency personnel 122 (e.g., firefighters, emergency responders) may be provided with a capability to determine fill rate 290 through air fill charge rate controller device 250 with respect to filling air bottles 270, as will be discussed below.

Figure 4:
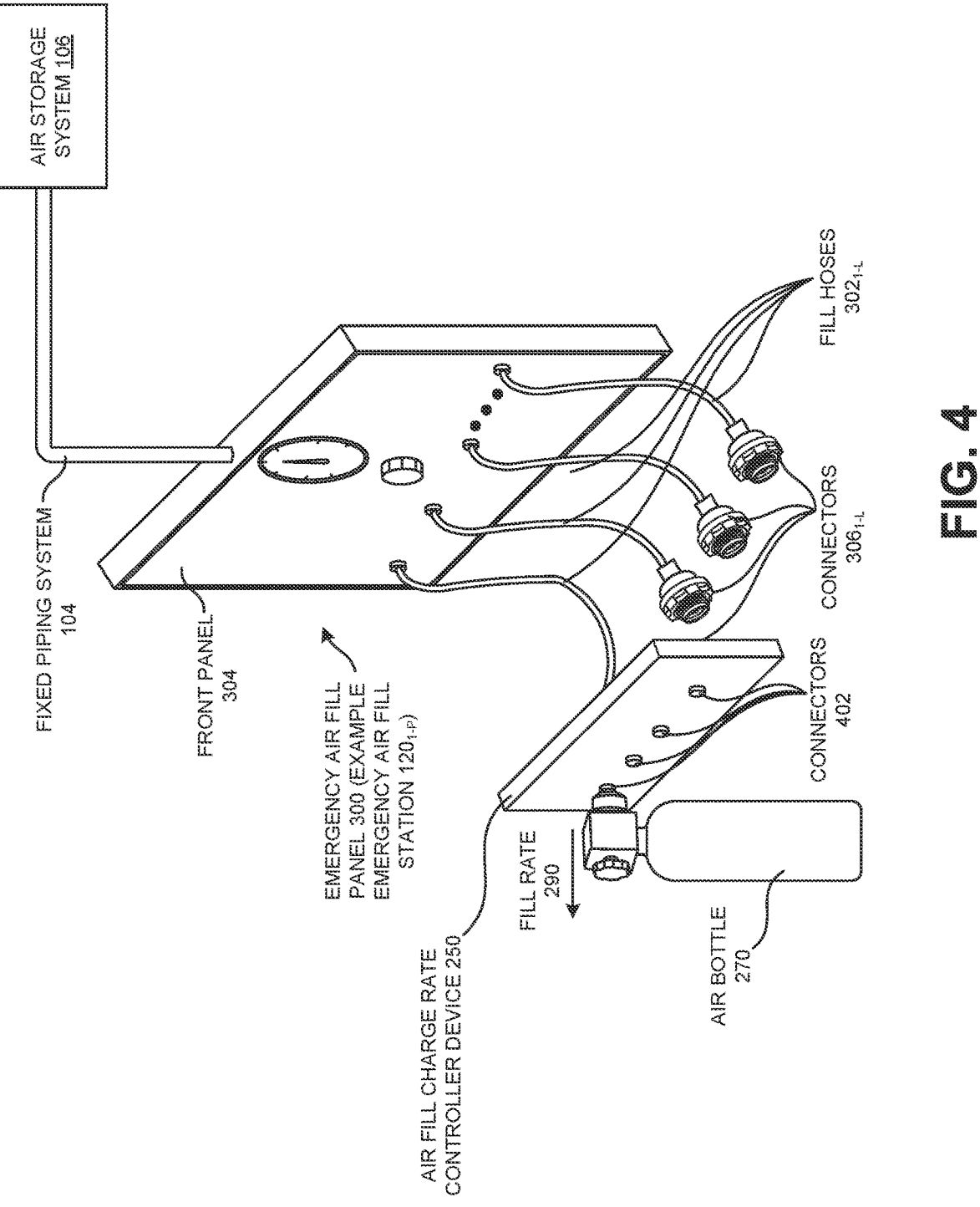
FIG. 4 is a schematic and an illustrative view of the emergency air fill panel of FIG. 3 with the air fill charge rate controller device of FIG. 2 coupled thereto, in which an air bottle is directly coupled to the air fill charge rate controller device.

It should be noted that emergency air fill stations $120_{1-P}$ may not be limited to emergency air fill panel 300. Other forms of emergency air fill stations $120_{1-P}$ such as rupture containment air fill stations are within the scope of the exemplary embodiments discussed herein. Also, variations in implementations of specific emergency air fill stations $120_{1-P}$ are within the scope of the exemplary embodiments discussed herein. Further, it should be noted that all components of emergency air fill panel 300 are not shown for the sake of illustrative convenience and clarity. FIG. 4 shows air fill charge rate controller device 250 coupled to connector $306_{1-L}$ (or, fill hose; other types are within the scope of the exemplary embodiments discussed herein) of emergency air fill panel 300, according to one or more embodiments. Here, in one or more embodiments, breathable air 103 from air storage system 106 may be directly distributed to emergency air fill panel 300 by way of fixed piping system 104. In one or more embodiments, breathable air 103 out of emergency air fill panel 300 may be subjected to control/regulation through air fill charge rate controller device 250 instead of breathable air 103 out of air storage system 106 as in the embodiments of FIGS. 2-3.

Figure 5:
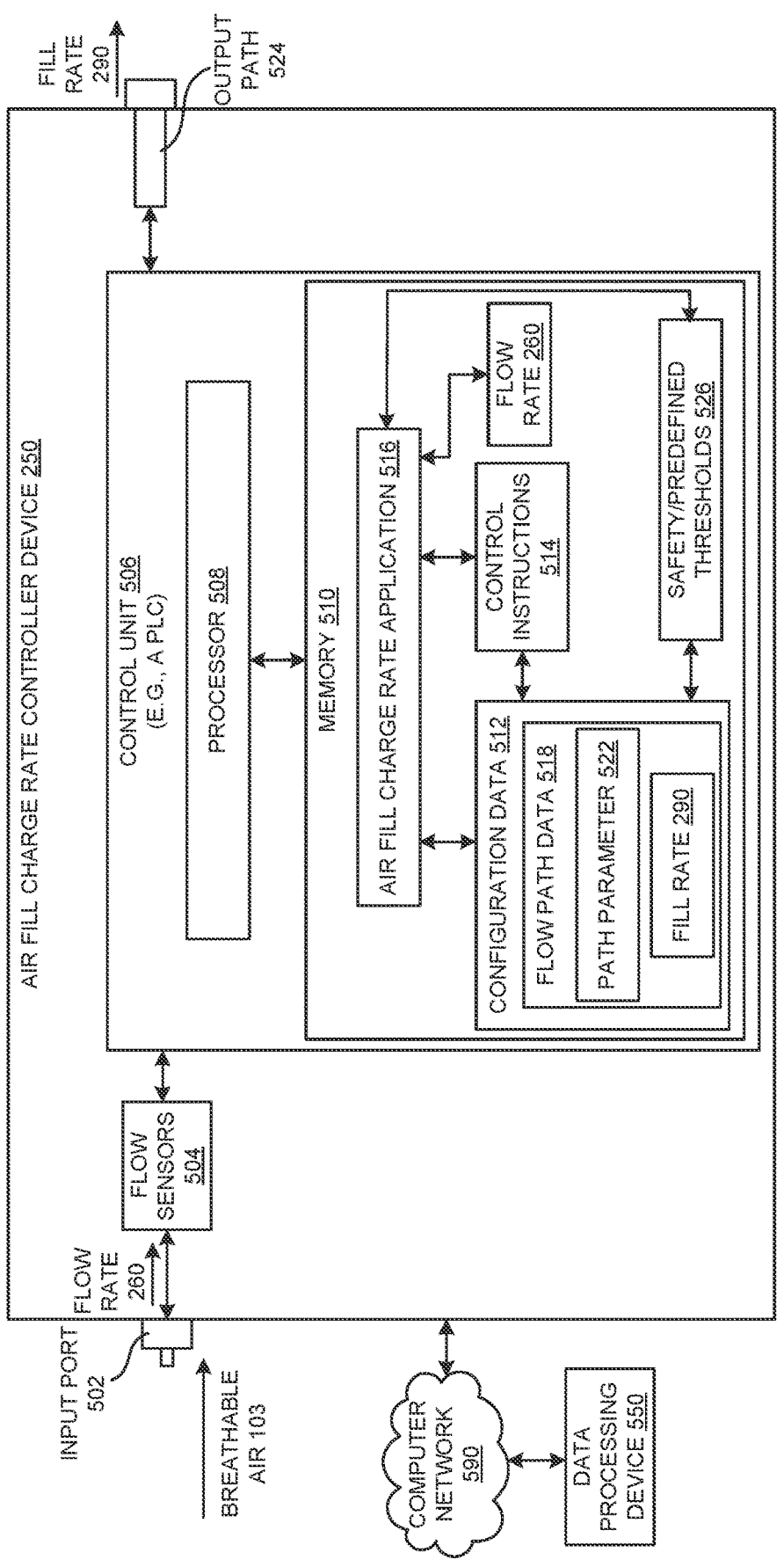
FIG. 5 is a schematic view of the air fill charge rate controller device of FIGS. 2-4 in detail, according to one or more embodiments.

In FIG. 4, in one or more embodiments, air fill charge rate controller device 250 may have connectors 402 (e.g., analogous to connectors $306_{1-L}$, different from connectors $306_{1-L}$) to enable coupling of air bottles 270 thereto. In one or more embodiments, air bottles 270 may be filled/replenished with breathable air 103 at the specific fill rate 290. FIG. 5 shows air fill charge rate controller device 250 in detail, according to one or more embodiments. In one or more embodiments, air fill charge rate controller device 250 may include an input port 502 to enable coupling of air storage system 106 (or, emergency air fill stations $120_{1-P}$/emergency air fill panel 300 by way of connector $306_{1-L}$) thereto. In one or more embodiments, the aforementioned coupling may enable breathable air 103 to get into air fill charge rate controller device 250.

In one or more embodiments, air fill charge rate controller device 250 may include one or more flow sensors 504 (e.g., electrical and/or mechanical devices with or without electronic components) to measure flow rate 260 of breathable air 103 into air fill charge rate controller device 250. As flow rate 260 of breathable air 103 may be related to pressure thereof, flow sensors 504, in one implementation, may measure a pressure differential between breathable air 103 through a path within air fill charge rate controller device 250 and an accelerated (or, decelerated) form thereof through the path (or, another path) within air fill charge rate controller device 250. The acceleration (or, deceleration) of breathable air 103 through air fill charge rate controller device 250 may be accomplished through, say, modifying a cross-sectional area of the path or a nozzle therein; increasing the cross-sectional area decelerates breathable air 103 and decreasing the cross-sectional area accelerates breathable air 103. The pressure differential discussed herein may relate to a velocity of breathable air 103 through air fill charge rate controller device 250 and, thereby, to flow rate 260.

It should be noted that the mechanism discussed above may merely be an example mechanism of working of flow sensors 504 and that other mechanisms/implementations (e.g., in addition to differential pressure flow sensors, velocity flow sensors, positive displacement flow sensors, mass flow sensors, open channel flow sensors, etc.) are within the scope of the exemplary embodiments discussed herein. In one or more embodiments, air fill charge rate controller device 250 may also include a control unit 506 to control various components of air fill charge rate controller device 250. In one implementation, control unit 506 may be a Programmable Logic Controller (PLC) with a display unit/ touchscreen for user (e.g., emergency personnel 122) inputs to be received. As shown in FIG. 5, control unit 506 may include a processor 508 (e.g., a microcontroller) communicatively coupled to a memory 510 (e.g., a volatile and/or a non-volatile memory); memory 510 may include configuration data 512 and control instructions 514 to be executed through processor 508. Memory 510 may also execute an air fill charge rate application 516 that provides a user interface accessible through the display unit/touchscreen.

In some other implementations, air fill charge rate controller device 250 may be communicatively coupled to a data processing device 550 (e.g., a mobile phone, a tablet, a laptop, a server) that also executes air fill charge rate application 516 via a computer network 590 (e.g., a short range and/or a long range network). Here, control instructions 514 to air fill charge rate controller device 250 may be issued from data processing device 550 in addition to/instead of air fill charge rate controller device 250 itself. In one or more embodiments, configuration data 512 may include flow path data 518 relevant to control instructions 514 associated with various fill rates (e.g., including fill rate 290). In one or more embodiments, fill rate 290 may be selected from predefined fill rates through the display unit/ touchscreen or custom input therethrough. In one or more embodiments, based on selected fill rate 290, control instructions 514 may be executed on processor 508 to modify a path parameter 522 (e.g., cross-sectional area that is part of flow path data 518) of an output path 524 of breathable air 103. In other words, as path parameter 522/cross-sectional area of output path 524 maps/is related to fill rate 290, modification thereof may result in modified output flow of breathable air 103 as fill rate 290. For example, fill rate 290 may be measured in PSI/minute.

In one or more embodiments, flow rate 260 of breathable air 103 via safety system 100/air fill charge rate controller device 250 may be tracked/measured to effect a modification of fill rate 290 (e.g., below a safety threshold; part of safety/predefined thresholds 526 in memory 510) at which air bottles 270 may be filled. In one or more embodiments, this may avoid "hot fills," as discussed above. Further, in one or more embodiments, through the controlled fill rate 290, breathable air 103 may be filled in air bottles 270 in a form optimized to a maximum allowable pressure (e.g., 5500 PSI) of filling. Referring back to FIG. 1, an emergency event 170 in the form of leakage of breathable air 103 within safety system 100 that has the potential to cause catastrophic losses of breathable air 103 may be detected through flow sensors 504 and control instructions 514 executed on processor 508 to communicate with air storage system 106 to trigger shutdown of breathable air 103 from air storage system 106. In some embodiments, the triggering of the shutdown of breathable air 103 may be effected from data processing device 550.

Figure 6:
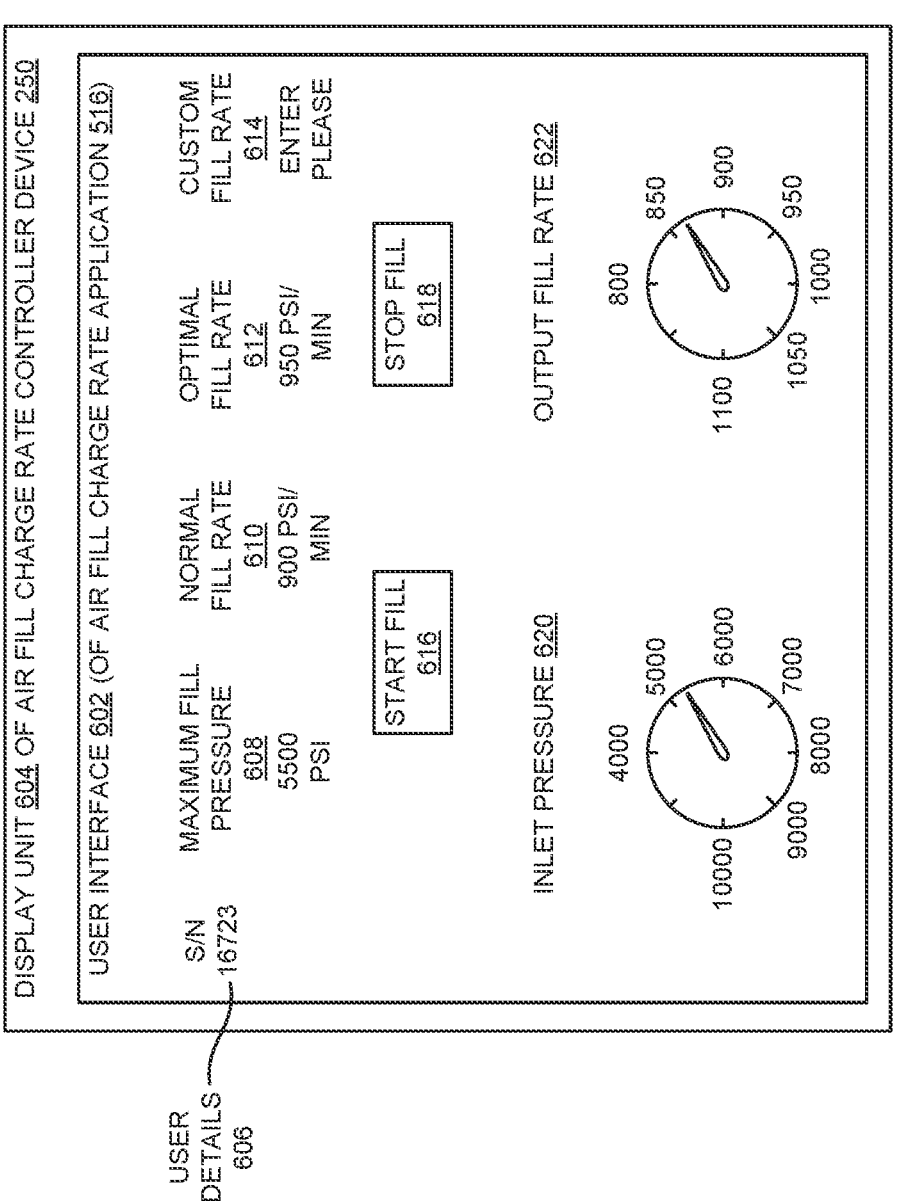
FIG. 6 is an example user interface view provided through a display unit of the air fill charge rate controller device of FIG. 5 via an air fill charge rate application executing thereon.

FIG. 6 shows an example user interface 602 provided to emergency personnel 122 through a display unit 604 of air fill charge rate controller device 250 via air fill charge rate application 516. As seen in FIG. 6, user interface 602 (e.g., interactable through a touchscreen) may provide profile details (e.g., user details 606) of emergency personnel 122 following a process of authentication (not shown). A maximum fill pressure 608 (e.g., 5500 PSI) may be displayed. In addition thereto, a normal fill rate 610, an optimal fill rate 612 (e.g., based on detection of flow rate 260) and a custom fill rate 614 (e.g., as desired by emergency personnel 122) may be displayed; said parameters may also be modifiable through user interface 602.

Emergency personnel 122 may trigger execution of control instructions 514 on processor 508 based on selecting the aforementioned parameters, initiating (e.g., through clicking a start fill 616 button) the process of filling air bottles 270 and/or stopping (e.g., through clicking a stop fill 618 button) the filling thereof. In addition, inlet pressure 620 (e.g., pressure of breathable air 103 input to air fill charge rate controller device 250) and output fill rate 622 (e.g., fill rate 290 at which air bottles 270 are filled/to be filled) may also be displayable/modifiable through user interface 602. The implementation of FIG. 6 is merely an example and all variations thereof are within the scope of the exemplary embodiments discussed herein. It is easy to envision enhanced profiling/analytics capabilities implemented through air fill charge rate controller device 250/air fill charge rate application 516/data processing device 550 (e.g., through computer network 590). Such advanced capabilities are within the scope of the exemplary embodiments discussed herein.

Thus, exemplary embodiments provide for a safe fill rate 290 at which air bottles 270 are to be filled. In one or more embodiments, said fill rate 290 may be dynamically determined based on air fill charge rate controller device 250 detecting flow rate 260 of breathable air 103 through safety system 100. Further, in one or more embodiments, as discussed above, breathable air 103 may be filled in air bottles 270 in a form optimized to a maximum allowable pressure of filling and leaks of breathable air 103 in safety system 100 may trigger shutdown of breathable air 103 from air storage system 106 based on the detection of flow rate 260 of breathable air 103 through air fill charge rate controller device 250. All reasonable variations are within the scope of the exemplary embodiments discussed herein.

Figure 7:
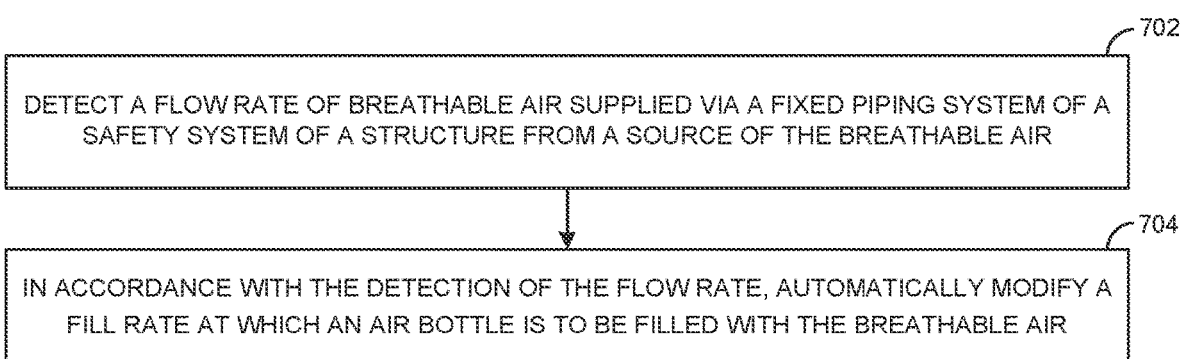
FIG. 7 is a process flow diagram detailing the operations involved in automatically modifying a rate of filling an air bottle with breathable air in a safety system implemented within a structure based on flow rate detection thereof, according to one or more embodiments.

FIG. 7 shows a process flow diagram detailing the operations involved in automatically modifying a rate of filling (e.g., fill rate 290) an air bottle (e.g., air bottle 270) with breathable air (e.g., breathable air 103) supplied via a fixed piping system (e.g., fixed piping system 104) in a safety system (e.g., safety system 100) implemented within a structure (e.g., structure 102) based on flow rate detection thereof, according to one or more embodiments. In one or more embodiments, operation 702 may involve detecting (e.g., through a flow sensor 504) a flow rate (e.g., flow rate 260) of the breathable air from a source (e.g., air storage system 106) thereof. In one or more embodiments, operation 704 may then involve, in accordance with the detection of the flow rate, automatically modifying (e.g., through a control unit 506 of an air fill charge rate controller device 250) the rate of filling of the breathable air.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a safety system of a structure having a fixed piping system implemented within the structure to supply breathable air from a source at a fill rate at which an air bottle is fillable with the breathable air, comprising:

detecting a flow rate of the breathable air from the source; and in accordance with the detection of the flow rate, automatically modifying the fill rate.

2. The method of claim 1, comprising:

installing an air fill charge rate controller device based on direct coupling to one of: the source of the breathable air and an emergency air fill station of the safety system coupled to the source of the breathable air by way of the fixed piping system;

detecting the flow rate of the breathable air using a flow sensor associated with the air fill charge rate controller device; and automatically modifying the fill rate using a control unit of the air fill charge rate controller device.

3. The method of claim 2, further comprising coupling the air bottle directly to a corresponding one of: the emergency air fill station and an output of the air fill charge rate controller device to fill the air bottle with the breathable air at the automatically modified fill rate.

4. The method of claim 2, comprising automatically modifying the fill rate based on modifying, through the control unit of the air fill charge rate controller device, a parameter of an output path of the breathable air out of the air fill charge rate controller device in accordance with the detection of the flow rate.

5. The method of claim 3, further comprising, in accordance with the automatically modified fill rate, optimizing the breathable air in the air bottle to a maximum allowable pressure of filling.

6. The method of claim 2, further comprising enabling, through the air fill charge rate controller device, a custom fill rate of filling the air bottle with the breathable air in addition to the automatically modified fill rate.

7. The method of claim 1, further comprising:

detecting leakage of the breathable air in the safety system based on the detection of the flow rate; and automatically triggering a shutdown of the breathable air from the source in accordance with the detection of the leakage.

8. A method of a safety system of a structure having a fixed piping system implemented within the structure to supply breathable air from a source at a fill rate at which an air bottle is fillable with the breathable air, comprising:

detecting a flow rate of the breathable air from the source;

in accordance with the detection of the flow rate, automatically modifying the fill rate; and filling the air bottle through the safety system with the breathable air at the automatically modified fill rate of the breathable air.

9. The method of claim 8, comprising:

installing an air fill charge rate controller device based on direct coupling to one of: the source of the breathable air and an emergency air fill station of the safety system coupled to the source of the breathable air by way of the fixed piping system;

detecting the flow rate of the breathable air using a flow sensor associated with the air fill charge rate controller device;

automatically modifying the fill rate using a control unit of the air fill charge rate controller device; and filling the air bottle with the breathable air at the automatically modified fill rate of the breathable air at an output of the air fill charge rate controller device.

10. The method of claim 9, further comprising coupling the air bottle directly to a corresponding one of: the emergency air fill station and the output of the air fill charge rate controller device to fill the air bottle with the breathable air at the automatically modified fill rate.

11. The method of claim 9, comprising automatically modifying the fill rate based on modifying, through the control unit of the air fill charge rate controller device, a parameter of an output path of the breathable air out of the air fill charge rate controller device in accordance with the detection of the flow rate.

12. The method of claim 10, further comprising, in accordance with the automatically modified fill rate, optimizing the breathable air in the air bottle to a maximum allowable pressure of filling.

13. The method of claim 9, further comprising enabling, through the air fill charge rate controller device, a custom fill rate of filling the air bottle with the breathable air in addition to the automatically modified fill rate.

14. The method of claim 8, further comprising:

detecting leakage of the breathable air in the safety system based on the detection of the flow rate; and automatically triggering a shutdown of the breathable air from the source thereof in accordance with the detection of the leakage.

15. A safety system of a structure, comprising:

a source of breathable air;

a fixed piping system installed within the structure for supply of the breathable air across the safety system;

an air fill charge rate controller device coupled to the breathable air from the source in the safety system; and a flow sensor associated with the air fill charge rate controller device to detect a flow rate of the breathable air from the source of the breathable air, wherein the air fill charge rate controller device comprises a control unit to, in accordance with the detection of the flow rate, automatically modify a fill rate at which an air bottle is to be filled with the breathable air.

16. The safety system of claim 15, wherein the air fill charge rate controller device is directly coupled to one of: the source of the breathable air and an emergency air fill station of the safety system coupled to the source of the breathable air by way of the fixed piping system.

17. The safety system of claim 16, wherein the air bottle is directly coupled to a corresponding one of: the emergency air fill station and an output of the air fill charge rate controller device to enable filling with the breathable air at the automatically modified fill rate.

18. The safety system of claim 15, wherein the control unit of the air fill charge rate controller device automatically modifies the fill rate based on modifying a parameter of an output path of the breathable air out of the air fill charge rate controller device in accordance with the detection of the flow rate.

19. The safety system of claim 15, wherein the air fill charge rate controller device enables a custom fill rate of filling the air bottle with the breathable air in addition to the automatically modified fill rate.

20. The safety system of claim 15, wherein at least one of: the flow sensor and the air fill charge rate controller device:

detects leakage of the breathable air in the safety system based on the detection of the flow rate, and automatically triggers a shutdown of the breathable air from the source in accordance with the detection of the leakage.

* * * * *